(12) United States Patent
Tanaka et al.

(10) Patent No.: US 6,697,113 B1
(45) Date of Patent: Feb. 24, 2004

(54) SOLID-STATE IMAGE PICK-UP DEVICE AND DRIVE METHOD FOR SAME

(75) Inventors: Toshiaki Tanaka, Saitama (JP); Katsuhiko Takebe, Saitama (JP)

(73) Assignees: Citizen Watch Co., Ltd., Tokyo (JP); Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/258,842

(22) Filed: Feb. 26, 1999

(30) Foreign Application Priority Data

Mar. 3, 1998 (JP) .......................... 10-050381

(51) Int. Cl.[7] .................. H04N 3/14; H04N 5/335; H04N 9/04; H01L 27/00
(52) U.S. Cl. .................. 348/308; 348/281; 250/208.1
(58) Field of Search .................. 348/302–308, 348/281

(56) References Cited

U.S. PATENT DOCUMENTS

| | | | | |
|---|---|---|---|---|
| 4,959,723 A | * | 9/1990 | Hashimoto | 348/302 |
| 5,019,702 A | * | 5/1991 | Ohzu et al. | 250/208.1 |
| 5,796,431 A | * | 8/1998 | Yonemoto | 348/308 |
| 5,998,779 A | * | 12/1999 | Kozuka | 250/208.1 |
| 6,061,093 A | * | 5/2000 | Yonemoto | 348/305 |
| 6,166,769 A | * | 12/2000 | Yonemoto et al. | 348/308 |
| 2001/0012070 A1 | * | 8/2001 | Enod et al. | 348/302 |

* cited by examiner

Primary Examiner—Andrew Christensen
Assistant Examiner—Tia M. Harris
(74) Attorney, Agent, or Firm—Greer, Burns & Crain, Ltd.

(57) ABSTRACT

In a solid-state image pick-up device having a photoelectrical conversion element cell array with a matrix arrangement of cells, between either a first or second signal line and a prescribed selection circuit that drives the signal line are provided a multiple signal line received light amount value storage means that includes a amount of received light detection means that separately reads out the amount of received light data for a plurality of photoelectrical conversion element cells connected to a plurality of selected signal lines in the other signal group, and a switching means that selectively transmits this detected amount of received light information to an output means.

41 Claims, 10 Drawing Sheets

PRIOR ART

PRIOR ART

SOLID-STATE IMAGE PICK-UP DEVICE AND DRIVE METHOD FOR SAME

BACKGROUND OF THE INVENTION

1. Field of the Invention

The present invention relates to an image pick-up device, to a circuit that reads out the amount of light that strikes photoelectrical conversion elements that are arranged in a matrix in a MOS solid-state image pick-up device, and to an associated method of readout therefrom. More particularly, the present invention relates to a MOS solid-state image pick-up device and drive method therefor, which are suitable for use, for example, in such apparatuses as visual sensors and high-speed cameras, which are required to read an amount of light incident to a photoelectrical conversion element at high speed.

2. Description of the Related Art

FIG. 9 is a circuit diagram of a MOS solid-state image pick-up device of the past, and FIG. 10 is a signal timing diagram showing signals for the purpose of reading out amounts of light from photoelectrical conversion elements that are arranged in a matrix in the MOS solid-state image pick-up device that is shown in FIG. 9.

First, referring to FIG. 9, the circuit of a prior art MOS solid-state image pick-up device will be described.

The MOS solid-state image pick-up device 100 shown in FIG. 9 is formed by a matrix arrangement of m rows and n columns of photoelectrical conversion elements 14 (m, n), each of these photoelectrical conversion elements 14 (m, n) being formed by a photoelectrical conversion element 11 (i, j) (i=1, 2, . . . , m and j=1, 2, . . . , n) and a first enhancement-type n-channel MOS transistor 13 (i, j) (i=1, 2, . . . , m and j=1, 2, . . . , n) for the purpose of vertical switching, and the sources of which is connected to each of these photoelectrical conversion elements 11 (i, j).

The m rows and n columns of conversion elements 14 (m, n) form the photoelectrical conversion element array 10.

Each of the gate terminals of the first vertical switching MOS transistors 13 (i, j) is commonly connected to a first signal line 15 (i) (i=1, 2, . . . , m), which is a vertical gate line 15 (i), for each one of rows, and each of the first vertical signal lines 15 (i) is connected to a vertical shift register 17, this being the vertical scanning circuit 17.

The drain terminals of each of the first enhancement-type n-channel MOS transistors 13 (i, j) used for vertical switching, are commonly connected to each other by a second signal line 19 (j) (j=1, 2, . . . , n), which is a vertical signal line 19 (i), for each one of columns.

Further, each of the second signal lines 19 (j), which are vertical signal lines 19 (j), is connected to a source of a second enhancement-type n-channel MOS transistor 21 (j) j=1, 2, . . . , n) used for horizontal switching, each of the drain of all these second MOS transistors 21 (j) used for horizontal switching, being commonly connected to a third signal line 23, which is the horizontal signal output line.

The gate terminals of each of the horizontal switching second MOS transistors 21 (j) are connected to a horizontal shift register circuit 27, which is a horizontal scanning circuit, via fourth connection lines 25 (j) (j=1, 2, . . . , n), which are horizontal gate lines. The third signal line 23, which is the horizontal signal output line, is connected to the input of a signal amplifier 29 and to one end of a readout load resistance 31, the other end of the readout load resistance 31 being connected to a power supply 33 that provides a constant voltage VM. The output of the signal amplifier 29 is connected to an output signal line 35.

Next, the operation of reading out an amount of light from a MOS solid-state image pick-up device is described below, with reference being made to FIG. 9.

First, the potential of the points of connection between each of the photoelectrical conversion elements 11 (i, j) before reading out the amount of light incident to the MOS solid-state image pick-up device and the sources of each of the MOS transistors 13 (i, j) are set to the constant voltage VM.

In this condition, when light is shined onto the image pick-up device, a photoelectric current that is proportional to the amount of light at each of the photoelectrical conversion elements 11 (i, j) is generated, resulting in the source potential of each of the first MOS transistors 13 (i, j) being reduced to below the constant voltage VM by an amount that is proportional to the amount of light.

Next, the vertical shift register circuit 17, which acts as the vertical scanning circuit, applies a position voltage only to the first signal line 15 (i) for which i=1 of the first signal lines 15 (1) to 15 (m), which are vertical gate lines, which results in n first MOS transistors 13 (1, 1) through 13 (1, n) being turned on, so as to conduct, this resulting in the source potentials of these n first MOS transistors 13 (1, 1) through 13 (1, n) appearing at the second signal lines 19 (1) through 19 (n), these being the n vertical signal lines.

Next, the horizontal shift register circuit 27, which acts as a horizontal scanning circuit, applies a positive voltage pulse sequentially to the fourth connection lines 25 (1) through 25 (n), these being the n horizontal gate lines, this resulting in the n horizontal switching second MOS transistors 21 (1) through 21 (n) being sequentially switched from on to off, so that the source potentials of the n vertical switching first MOS transistors 13 (1, 1) through 13 (1, n) sequentially appear at the third signal line 23, which serves as the horizontal signal output line, from the second signal lines 19 (1) through 19 (n), which act as vertical signal lines, via the second MOS transistors 21 (1) through 21 (n).

When this happens, because the third signal line 23 is, via the readout load resistance 31, connected to the constant-voltage VM power supply 33, a current flows into the third signal line 23 that is proportional to a voltage that has been lowered because of the incident light.

This current is converted to a voltage by the readout load resistance 31, is amplified by the signal amplifier 29 that is connected to the third signal line 23, and is output to the output signal line 35. In this manner, it is possible to know the amount of light that is shined on each of the photoelectrical conversion elements 11 (1, 1) through 11 (1, n) as a voltage value.

Next, the vertical shift register circuit 17 applies a positive voltage to only one of the first signal line, for which i=2, selected from the first signal lines 15 (1) through 15 (n), thereby causing the n vertical switching first MOS transistors 13 (2, 1) through 13 (2, n) to conduct, and the above-noted procedure is repeated so as to enable the determination of the amount of light shining on the n photoelectrical conversion elements 11 (2, 1) through 11 (2, n).

Thus, by sequentially outputting m positive voltage pulses from the vertical shift register circuit 17 to the first signal line 15 (i), and by having the horizontal shift register 27 sequentially output n positive voltage pulses during the time period in which the above-noted pulses are positive, it is possible to determine the amount of light shining on all of the photoelectrical conversion elements 11 (1,1) through (m, n).

FIG. 10 is a drawing that illustrates the operational timing of reading out the amount of light shining on the above-noted photoelectrical conversion elements 11 (1, 1) through (1, n).

The above operation will be described using FIG. 10. A positive potential pulse having a pulse width Tv 37 from the vertical shift register circuit 17 is output to the first signal line 15 (1), which is the vertical gate line.

Pulses having the pulse width Th 39, which change from low level to high level and then from high level to low level with a period of Wh 40, during the period of Tv 37 in which the first signal line 15 (1) is at the high level, are sequentially output to the fourth signal lines 25 (1) through 25 (n), from the horizontal shift register 27, which is the horizontal scanning circuit.

After an elapsed time of Ta 41 after each of the fourth signal lines 25 (1) through 25 (n), which are the horizontal gate lines, changes to a high level, a voltage that is proportional to the current that flows into each of the photoelectrical conversion elements 11 (1, 1) through 11 (1, n) appears at the third signal line 23, which is the input of the signal amplifier 29. This then is output to the output signal line 35 of the signal amplifier 29, so that the amount of light shining on the photoelectric conversion elements is read out.

An MOS solid-state image pick-up device of the past was configured as described above, so as to read out the amount of light shined on the photoelectric conversion elements and, by sequentially turning the vertical switching second MOS transistors 21 (i) on and also having the horizontal switching second MOS transistors 21 (i) turn on in sequence, a current that is proportional to the amount of light shined on the photoelectrical conversion elements 11 (i, j) is sequentially connected to and converted to a voltage by the readout load resistance 31.

That is, if the speed of readout by voltage conversion of a current that is proportional to the amount of light at a single photoelectrical conversion element 11 (i, j) is Ta 41, the time for voltage conversion and readout of the currents that are proportional to amounts of light shined on all the photoelectrical conversion elements 11 (1, 1) through 11 (n, m) would be Ta 41 times n (i.e., Ta 41×n)

That is, the readout time required for the amount of light shined on all the photoelectrical conversion elements 11 (1, 1) through 11 (n, m) of a MOS solid-state image pick-up device would be (Ta 41×n)×m or greater.

Because the setting must be made so that Ta 41<Th 39, the readout of the amount of light shined on all the photoelectric conversion elements 11 (1, 1) through 11 (n, m) is at least (Th 39×n)×m.

Because the on resistance of the vertical switching first MOS transistor 13 (i, j) is high, the time Ta 41 becomes long, and for this reason there is the problem of an extremely long time required to read out the amounts of light shining on all the photoelectrical conversion elements 11 (1, 1) through 11 (n, m) of the MOS solid-state image pick-up device.

Accordingly, it is an object of the present invention to improve on the drawbacks of the prior art as described above, and in particular to provide a solid-state image pick-up device, and more particularly a MOS solid-state image pick-up device that is capable of reading out the amounts of light shining on all the photoelectrical conversion elements of the MOS solid-state image pick-up device, doing this at high speed and also with good accuracy. An additional object of the present invention is to provide a method of driving a solid-state image pick-up device, this drive method being capable of reading out the amounts of light shining on all the photoelectrical conversion elements of the MOS solid-state image pick-up device, doing this at high speed and also with good accuracy.

SUMMARY OF THE INVENTION

In order to achieve the above-noted object, the present invention has the following described basic technical constitution.

Specifically, a first aspect of a solid-state image pick-up device according to the present invention is a solid-state image pick-up device that is formed by a first group of signal lines, a second group of signal lines, each of which intersecting those of the first group of signal lines in a matrix arrangement, a first selection circuit that sequentially selects and drive the first group of signal lines, a second selection circuit that sequentially selects and drive the second group of signal lines, a plurality of photoelectrical conversion element cells that are provided in the vicinity of each one of a region of intersection points formed between each one of lines of the first group of signal lines and each one of lines of the second group of signal lines, and that are connected thereto, and at least an output means for separately outputting individual amounts of received light information of the photoelectrical conversion element cells, and wherein the device further comprising, a multiple signal line received light amount value storage means which is provided separately between either the first group or the second group of signal lines and a prescribed selection circuit which drives the selected group of signal lines and which is provided on each one of the signal lines in the selected group of signal lines, and which individually stores therein, an amount of received light information of each one of a plurality of photoelectrical conversion element cells, each connected to a selected one of the separate signal lines contained in another group of signal lines, respectively, while each of the plurality of multiple signal line received light amount value storage means is further provided with an amount of received light detection means, each of which reads out, respectively, for each one of the signal lines in the another group of signal lines, the amounts of received light information of each one of the plurality of photoelectrical conversion element cells connected to a selected one of the separate signal lines contained in the another group of signal lines, and a switching means that causes the detected amount of received light information to be transmitted to the output means.

A second aspect of a solid-state image pick-up device according to the present invention is a solid-state image pick-up device that is formed by a first group of signal lines, a second group of signal lines, each of which intersecting those of the first group of signal lines in a matrix arrangement, a first selection circuit that sequentially selects and drive the first group of signal lines, a second selection circuit that sequentially selects and drive the second group of signal lines, a plurality of photoelectrical conversion element cells that are provided in the vicinity of each one of a region of intersection points formed between each one of lines of the first group of signal lines and each one of lines of the second group of signal lines, and that are connected thereto, at least an output means for separately outputting individual amounts of received light information of the photoelectrical conversion element cells, a multiple signal line received light amount value storage means which is provided separately between either the first group or the second group of signal lines and a prescribed selection circuit which drives the selected group of signal lines and which is provided on each one of the signal lines in the selected group of signal lines, and which individually stores therein, an amount of received light information of each one of a plurality of photoelectrical conversion element cells, each connected to a selected one of the separate signal lines contained in another group of signal lines, respectively, while each of the plurality of multiple signal line received light amount value storage means is further provided with an amount of received light detection means, each of which reads out, respectively, for each one of the signal lines in the another group of signal lines, the amounts of received light information of each one of the plurality of photoelectrical conversion element cells connected to a selected one of the separate signal lines contained in the another group of signal lines, and a switching means that causes the detected amount of received light information to be transmitted to the output means, wherein, the image pick-up device being configured so that, by selecting a part of signal lines of either one of the first or the second group of signal lines, individual amount of received light information for each of the plurality of photoelectrical conversion element cells, each connected to each one of the signal lines of the selected group of signal lines, is read out, while by sequentially scanning each one of the signal lines in the another group of signal lines, the individual amount of received light information read out from each one of the read photoelectrical conversion element cells is sequentially and separately output to the output means, respectively, wherein in the device, during a period of time in which one of the signal lines of the selected group of signal lines is selected and individual amount of received light information for each one of the plurality of photoelectrical conversion element cells each connected to one of the selected signal line of the selected group of signal lines is output to the output means, by selecting a separate signal line of the selected group of signal lines, individual amount of received light information for a plurality of photoelectrical conversion element cells each connected to the separate signal line of the selected group of signal lines is read out.

A third aspect of an image pick-up device according to the present invention is an image pick-up device having a first group of signal lines, a second group of signal lines, each of which intersecting those of the first group of signal lines in a matrix arrangement, a first selection circuit that sequentially selects and drive the first group of signal lines, a second selection circuit that sequentially selects and drive the second group of signal lines, a plurality of photoelectrical conversion element cells that are provided in the vicinity of each one of a region of intersection points formed between each one of lines of the first group of signal lines and each one of lines of the second group of signal lines, and that are connected thereto, at least an output means for separately outputting individual amounts of received light information of the photoelectrical conversion element cells, a multiple signal line received light amount value storage means which is provided separately between either the first group or the second group of signal lines and a prescribed selection circuit which drives the selected group of signal lines and which is provided on each one of the signal lines in the selected group of signal lines, and which individually stores therein, an amount of received light information of each one of a plurality of photoelectrical conversion element cells, each connected to a selected one of the separate signal lines contained in another group of signal lines, respectively, while each of the plurality of multiple signal line received light amount value storage means is further provided with an amount of received light detection means, each of which reads out, respectively, for each one of the signal lines in the another group of signal lines, the amounts of received light information of each one of the plurality of photoelectrical conversion element cells connected to a selected one of the separate signal lines contained in the another group of signal lines, and a switching means that causes the detected amount of received light information to be transmitted to the output means, wherein, the image pick-up device being configured so that, a plurality of the output means being parallely provided to form a multi-step like configuration, and the device being further configured so that, after a signal line of the selected group of signal lines is selected therefrom, and individual amount of received light information for a plurality of photoelectrical conversion element cells connected to one of the selected signal lines are read out therefrom, respectively, and stored in each one of prescribed storage means, respectively, by selecting a separate signal line of the selected group of signal lines, separate individual amount of received light information for a plurality of the photoelectrical conversion element cells connected to the separate signal line of the selected group of signal lines are read out therefrom, respectively, and stored in each one of prescribed storage means, respectively, and further wherein, the individual amount of received light information for the plurality of photoelectrical conversion element cells connected to the one signal line of the selected group of signal lines and the separate individual amount of received light information for the plurality of photoelectrical conversion element cells connected to the separate signal line of the selected group of signal lines being simultaneously and separately output to each of the plurality of output means, respectively.

A fourth aspect of the present invention is a drive method for an image pick-up device that has, for example, a first group of signal lines, a second group of signal lines, each of which intersecting those of the first group of signal lines in a matrix arrangement, a first selection circuit that sequentially selects and drive the first group of signal lines, a second selection circuit that sequentially selects and drive the second group of signal lines, a plurality of photoelectrical conversion element cells that are provided in the vicinity of each one of a region of intersection points formed between each one of lines of the first group of signal lines and each one of lines of the second group of signal lines, and that are connected thereto, and at least an output means for separately outputting individual amounts of received light information of the photoelectrical conversion element cells, wherein the method of drive is configured so that by scanning either the first group of signal lines or the second group of signal lines, as a selected group of signal lines, an operation of separately reading out the individual amount of received light information for the plurality of photoelectrical conversion element cells connected to selected one of the signal lines of the another group of signal lines, and further operation of outputting the results of the readout to the output means,are performed, sequentially, the method thereof being characterized in that, during one period of time in which each one of the signal lines in the selected group of signal lines are scanned, an operation of reading out the individual amount of received light information for the plurality of photoelectrical conversion element cells connected to each one of at least two selected signal lines of the another group of signal lines group, respectively, and an operation of outputting the information are performed simultaneously or both of the reading out operation and the outputting operation are performed consecutively.

By adopting the above-described technical constitution, an image pick-up device according to the present invention can be contrasted to an image pick-up device from the prior art as follows.

In the case of the prior art image pick-up device, illustrated, for example, as the MOS solid-state image pick-up device 100 of FIG. 9, one of the first signal lines 15 (i), which are vertical gate lines, is selected and the individual amounts of received light information for the plurality of photoelectrical conversion element cells 14 (i, 1) to 14 (i, n) that are connected to the selected first signal line 15 (i) are separately read out, but it was not possible, before the operation of outputting the results of this readout to the output means is completed, to select the next first signal line 15 (i+1), separately read out the individual amounts of received light information for the plurality of photoelectrical conversion element cells 14 (i+1, 1) to 14 (i+1, n) that are connected thereto and output the results of this readout to the output means.

In contrast to this, in the present invention, for example, one of the first signal lines 15 (i), which are vertical gate lines, is selected, and the respective amount of received light information for each of the photoelectrical conversion element cells 14 (i,1) to 14 (i, n) that is connected to the selected first signal line 15 (i) is separately read out and output to the output means and, during the period of performing this operation, it is possible to select the next first signal line 15 (i+1) and to simultaneously perform the operation of reading out the respective amount of received light information of the plurality of photoelectrical conversion element cells 14 (i+1. 1) to 14 (i+1, n) that is connected thereto or the operation of outputting the readout results.

Because, in the manner described above, it is also possible to perform the operation of simultaneously reading out the amount of received light information for the plurality of photoelectrical conversion element cells 14 corresponding to the first signal lines 15 (i) and 15 (i+1), which are adjacent to one another, it is possible to greatly reduce amount of time required to detect and output the amount of received light information for this plurality of photoelectrical conversion element cells.

DESCRIPTION OF THE PREFERRED EMBODIMENTS

A preferred embodiment of an image pick-up device according to the present invention is described in detail below, with references being made to the relevant accompanying drawings.

Figure 1:
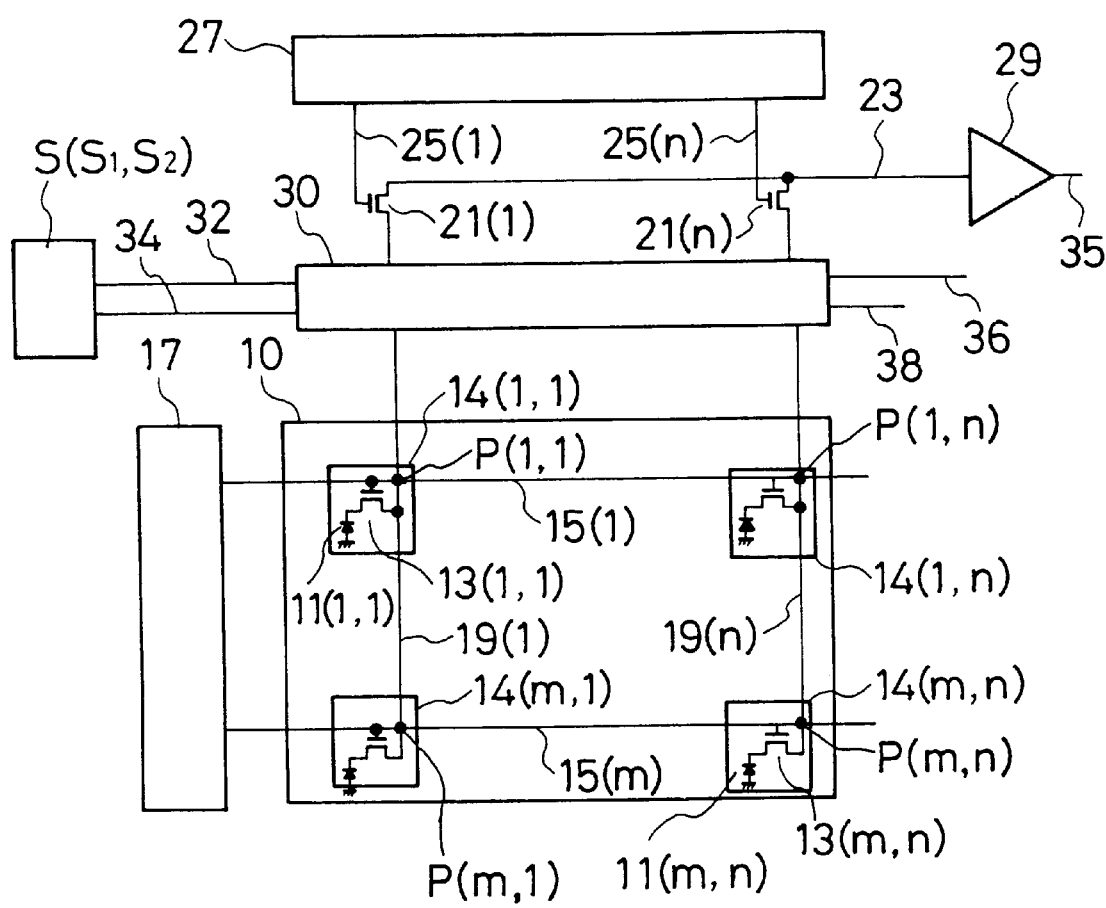
FIG. 1 is a block diagram that shows the configuration of an example of an image pick-up device according to the present invention.

Specifically, FIG. 1 is a block diagram that shows the configuration of an example of an image pick-up device according to the present invention. This drawing shows an image pick-up device 100, which has first signal lines 15, second signal lines 19, which intersect with the first signal lines 15 in a matrix arrangement, a first selection circuit 17 that selectively and sequentially drives the first signal lines 15, a second selection circuit 27 that selectively and sequentially drives the second signal lines 19, and a photoelectrical conversion element cell array 10 formed by a plurality of photoelectrical conversion element cells 14 (1, 1) to 14 (m, n), which are disposed in the region of the intersection points P1, P2, P3, and so on, formed between the first signal lines 15 and the second signal lines 19, and which are connected respectively to both first group of signal lines 15 and second group of signal lines 19.

Figure 2:
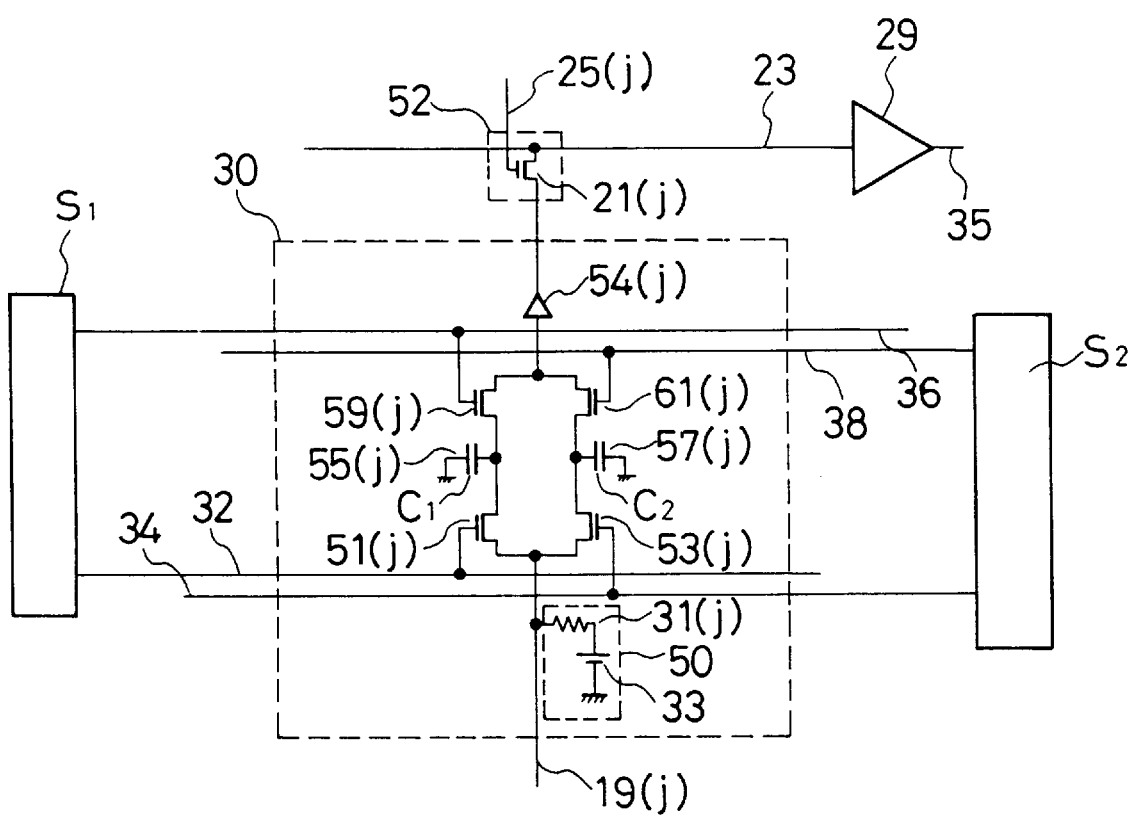
FIG. 2 is a block diagram that shows the configuration of an example of a plurality of a multiple signal line amount of received light value storage means that is used in an image pick-up device according to the present invention.

In this image pick-up device 100, between either the first group of signal lines 15 or the second group of signal lines 19 and a prescribed selection circuit 17 or 27 that drives those signal lines, is provided a multiple signal line received light amount value storage means 30, which includes a received light amount detection means 50 (as shown in FIG. 2) that individually reads out the respective received light amount information of the plurality of photoelectrical conversion element cells 14 (1, 1) to 14 (m, n) that are connected to each one of signal lines of another group of signal lines, not selected in above mentioned period, and a switching means 52 that selectively transmits the detected received light amount information individually to an output means 35.

The received light amount detection means 50 as shown in FIG. 2, that is used in the present invention comprises a voltage conversion means that converts to a voltage value the amount of current that is generated by the photoelectrical conversion element cell 14 (1, 1) to 14 (1, n), that are connected to one of as selected and prescribed signal line 15 (1), for example, of another group of signal lines.

Note that, when the second group of signal lines 19 is first selected, another group of signal lines corresponds to the first group of signal lines 15.

For example, it is desirable that the voltage detection means 50 be a resistor 31 (j) that has its other end connected to a constant-voltage power supply 33.

Additionally, it is preferable that the multiple signal line received light amount value storage means 30 that is used in the present invention be formed by a plurality of voltage value storage means 55 (j) and 57 (j) that, for example, with respect to individual photoelectrical conversion element cell 14 that are connected to a plurality of signal lines selected from the signal lines of 15 (m), that is, for example, 15 (1) and 15 (2) and so on, individually store voltage values that are detected by voltage value detection means that are formed by the received light amount detection means 50, which are voltage conversion means.

Furthermore, these plurality of voltage value storage means 55 (j) and 57 (j) in the multiple signal line received light amount value storage means 30 that is used in the present invention are provided individually for the plurality of signal lines of another group of signal lines, for example, the first group of signal lines, such as 15 (1), 15 (2), and so on.

It is desirable that the voltage value storage means 55 (j) and 57 (j) that are used in the present invention have one end connected to one of the group of signal lines, for example to 19 (j) in the second group of signal lines, and the other end connected to capacitors C1 and C2, the other ends of which are grounded.

The photoelectrical conversion element cell 14 used in the present invention is, for example, formed by at least one photoelectrical conversion element cell 11 (m, n) and one transistor 13 (m, n).

Additionally, the transistor 13 (m, n) that is used in the present invention can be a MOSFET transistor.

It is desirable that the switching means 52 that is used in the present invention be formed by a MOSFET transistor 21 (j).

In the present invention, the first signal line 15 is, for example, a row line 15 (m), and the second signal line 19 is, for example, a column line 19 (n).

In the present invention, there can be a single output means 35, and there can also be, as described later in an embodiment of the present invention, a plurality of output means 35 (a), 35 (b), and so on, these being provided in parallel.

In the present invention, it is desirable that the multiple signal line received light amount value storage means 30 have a plurality of control means S1 (32, 36), S2 (34, 38), and so on, in which input signal switching means 32 and 34 and output signal switching means 36 and 38 are paired, respectively.

The control means S1 and S2, as will be described later, are each grouped with individual input switching signal lines and output switching signal lines, each of the individual signal lines being capable of being in either the on or the off condition, in response to a control signal from an appropriate control means (not shown).

In the present invention, that is, by virtue of the circuit configuration of the multiple signal line received light amount value storage means 30, which will be described later, by selecting either of the plurality of control means S1 (32, 36) or S2 (34, 38), the voltage values of the individual photoelectrical conversion element cells 14 (1) to 14 (n) that are connected to any one of signal lines 15 (m) of another group of signal lines are stored in a selected voltage value storage means 55 (j) or 57 (j) within the plurality of multiple signal line received light amount value storage means 30.

In the case, for example, in which the single signal line 15 (1) is selected from the first group of signal lines 15, control is performed so that the control means S1 (32, 36) is, for example, selected and so that the first input switching signal line 32 thereof is set to on, the result being that the voltage values of the individual photoelectrical conversion element cells 14 (1, 1) to 14 (1, m) that are connected to the signal line 15 (1) are stored into the voltage value storage means 55 (1) to 55 (n) that are selected within the plurality of multiple signal line received light amount value storage means 30, respectively.

In the same manner, by switching the plurality of control means S1 (32, 36) and S2 (34, 38), the voltage values of the individual photoelectrical conversion element cells 14 (2, 1) to 14 (2, n) that are connected to separate signal line, for example 15 (2) of another group of signal lines, i.e., the first group of signal lines are stored into a different voltage storage means, for example 57 (j) within the multiple signal line received light amount value storage means 30.

That is, in the case, for example, in which the separate signal line 15 (2) is selected from among the first group of signal lines 15, control is performed so as to select the control means S2 (34, 38) and so as to set the second input switching signal line 34 thereof to on, the result being that the voltage values of the individual photoelectrical conversion element cells 14 (2, 1) to 14 (2, n) that are connected to the signal line 15 (2) are stored into the voltage value storage means 57 (1) to 57 (n) selected in the plurality of multiple signal line received light amount value storage means 30, respectively.

Thereafter in the present invention, by selecting one of the groups of control means in the multiple signal line received light amount value storage means 30, the voltage values that had been stored into the voltage value storage means selected within with the plurality of voltage value storage means 55 (j) or 57 (j) are output to the output means 35 via the switching mean 52.

That is, in the case, for example, in which one signal line 15 (1) is selected from the first group of signal lines 15, control is performed so as to select the control means S1 (32, 36) and so as to set the first output switching signal 36 to on, the result being that the voltage values that are stored in the voltage value storage means 55 (1) to 55 (n) are output to the output means 35 via the switching means 52 and, in the case in which separate signal line 15 (2) is selected from the first group of signal lines 15, control is performed so as to select the control means S2 (34, 38) and so as to set the second output switching signal 38 to on, the result being that the voltage values stored respectively in the voltage value storage means 57 (1) to 57 (n) are output to the output means 35 via the switching means 52.

It is desirable that the plurality of groups of control means S1 (32, 36) and S2 (34, 38) in the present invention both be commonly provided to each one of the multiple signal line received light amount value storage means 30, which is provided on each one of the selected signal lines, for example, the second group of signal lines 19, respectively.

Additionally, in the present invention it is preferable that the switching means 52 be configured by a MOSFET 21 (j), and that the one selected signal lines, for example the second signal lines 19 (n) be sequentially and selectively driven by an output signal from the selection circuit 27.

It is desirable that the switching means 52 and the multiple signal line received light amount value storage means 30 in the present invention being mutually connected, via either an impedance conversion means or buffer means 54 within the multiple signal line received light amount value storage means 30.

One end of the voltage detection means 50 in the present invention is connected to each of the selected signal lines, for example to the signal lines 19 (j) of the second group of signal lines, the output end of the switching means 52 is connected to a signal line 23 that is connected to a common output means 35, and the control terminal of the switching means 52 is connected to a control signal output terminal of the selection circuit 27, which selectively and sequentially drives the signal line group 19 (j).

The configuration of the image pick-up device 100 according to the present invention can be summarized as follows.

Specifically, the image pick-up device 100 has first group of signal lines 15, second group of signal lines 19, which intersect with the first signal lines 15 in a matrix arrangement, a first selection circuit 17 that selectively and sequentially drives the first signal lines 15, a second selection circuit 27 that selectively and sequentially drives the second signal lines 19, and a photoelectrical conversion element cell array 10 formed by a plurality of photoelectrical conversion element cells 14 (1, 1) to 14 (m, n), which are disposed in the regions of the intersection points P1, P2, P3, and so on between the first group of signal lines 15 and the second group of signal lines 19, and which are connected respectively to both signal lines 15 and 19.

In this image pick-up device by selecting part of the either the first or the second group of signal lines, the individual received light amount information for the plurality of photoelectrical conversion element cells 14 (m, 1) to 14 (m, n) that are connected to the selected group of signal lines 15 (m) are read out and another group of signal lines 19 are sequentially scanned, thereby sequentially and separately outputting to the output means 35 the individual amount of received light information of the read out photoelectrical conversion element cells.

In this image pick-up device 100, one signal line 15 (m) of the first signal lines 15 is selected and, in the time during which the individual amount of received light information of the plurality of photoelectrical conversion element cells 14 (m, 1) to 14 (m, n) connected to the selected signal line 15 (m) is being output to the output means 35, by selecting another signal line 15 (m+1) of the first signal lines 15, the individual amount of received light information of the plurality of photoelectrical conversion element cells 14 (m+1, 1) to 14 (m+1, n) connected to the other signal line 15 (m+1) is read out.

That is, in this embodiment of the present invention, in the multiple signal line received light amount value storage means 30, by selecting either of the plurality of control means S1 (32, 36) and S2 (34, 38), the individual voltage values of the photoelectrical conversion element cells that are connected to one signal line in the other group of signal lines are stored into one of the voltage value storage means, for example, into 55 (j), of the plurality of voltage value storage means 55 (j) and 57 (j).

Additionally, by switching the plurality of control means S1 (32, 36) and S2 (34, 38), the voltage values of the individual photoelectrical conversion element cells that are connected to a separate signal line of another group of signal lines are stored into a different voltage value storage means, such as 57 (j), of the plurality of voltage value storage means.

The multiple signal line received light amount value storage means 30 that is used in the present invention is described in detail below, with reference being made to FIG. 2.

In the multiple signal line received light amount value storage means 30 a voltage detection means 50 is connected to one signal line selected from the first group of signal lines 15 and the second group of signal lines 19, for example a signal line 19 (j) selected from the second group of signal lines 19, as are the source terminals of the at least two input switching transistors 51 (j) and 53 (j), the drain terminals of the input switching transistors 51 (j) and 53 (j) are separately connected to them a capacitor 55 (j) and 57 (j), respectively, and these drain terminals also being connected to the source terminals of additionally provided output switching transistors 59 (j) and 61 (j).

Additionally, the other terminals of the capacitors 55 (j) and 57 (j) are grounded, and the drain terminals of the two output switching transistors 59 (j) and 61 (j) are connected in common to a switching means 52, via an impedance conversion circuit 54 (j).

Additionally, the gate terminal of the switching transistor 51 (j), which is one of the two input switching transistors 51 (j) and 53 (j), has connected to it a first input switching signal line 32, and the gate terminal of the other switching transistor 53 (j) is connected to a second input switching signal line 34.

The gate terminal of the output switching transistor 59 (j), which is connected to the drain of the input switching transistor 51 (j) that is connected to the first input switching signal line 32 is connected to the first output switching signal line 36, and the gate terminal of the output switching transistor 61(j), which is connected to the drain of the input switching transistor 53 (j) that is connected to the second input switching signal line 34 is connected to the second output switching signal line 38.

Next, the configuration of another embodiment of an image pick-up device according to the present invention will be described in detail, with references being made to FIG. 1 and FIG. 5.

Specifically, another embodiment of an image pick-up device according to the present invention has first signal lines 15, second signal lines 19, which intersect with the first signal lines 15 in a matrix arrangement, a first selection circuit 17 that selectively and sequentially drives the first signal lines 15, a second selection circuit 27 that selectively and sequentially drives the second signal lines 19, and a photoelectrical conversion element cell array 10 formed by plurality of photoelectrical conversion element cells 14 (1, 1) to 14 (m, n), which are disposed in the region of the intersection points P1, P2, P3, and so on between the first signal lines 15 and the second signal lines 19, and which are connected respectively to both signal lines 15 and 19.

In this image pick-up device 100, by selecting part of either the first or the second group of signal lines, the received light amount information for the plurality of photoelectrical conversion element cells 14 (m, 1) to 14 (m, n) that are connected to the selected signal line 15 (m) are read out and the other signal lines 19 are sequentially scanned, thereby sequentially and separately outputting to the output means 35 the individual amount of received light information of the read out photoelectrical conversion element cells.

In this image pick-up device 100, one signal line 15 (m) of the first group of signal lines is selected and, after reading out the individual amount of received light information of the plurality of photoelectrical conversion element cell 14 (m, 1) to 14 (m, n) connected to the selected signal line 15 (m) and storing this information in a prescribed storage means 55 (j), by selecting a separate signal line 15 (m+1) of the first group of signal lines, the individual amounts of received light information of the plurality of photoelectrical conversion element cells 14 (m+1, 1) to 14 (m+1, n) connected to the separate signal line 15 (m+1) is read out and stored in a prescribed storage means 57 (j).

Thus, the individual amount of received light information for the plurality of photoelectrical conversion element cells connected to one signal line 15 (m) of the first group of signal lines and the individual amount of received light information for the plurality of photoelectrical conversion element cells connected to the separate signal line 15 (m+1) of the first group of signal lines are simultaneously and separately output to the plurality of output means 35a and 35b.

In this embodiment of the present invention, it goes without saying that the parts that are in common with the previously described embodiment of the present invention are applied as is.

Next, the multiple signal line received light amount value storage means 30 used in the other embodiment of the present invention will be described in detail, with reference being made to FIG. 5.

Specifically, in the multiple signal line received light amount value storage means 30 that is used in this embodiment of the present invention, the voltage values that are stored in the plurality of voltage value storage means 55 (j) and 57 (j) are output simultaneously to the plurality of output means 35a and 35b, respectively, via the switching means 52.

Figure 5:
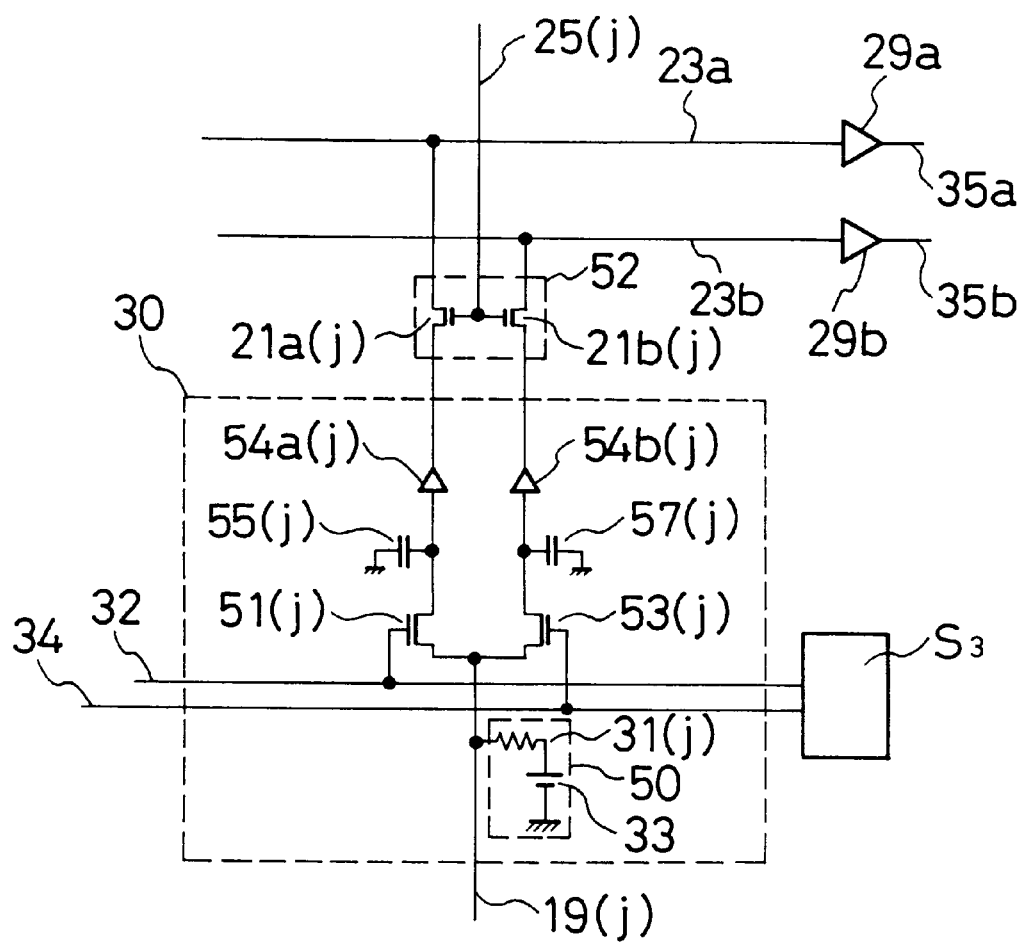
FIG. 5 is a block diagram that shows the configuration of an example of a multiple signal line amount of received light value storage means that is used in another image pick-up device according to the present invention.

In this embodiment, as shown in FIG. 5, the voltage detection means 50 is connected to one signal line selected from the first signal lines 15 and the second signal lines 19, for example a signal line (j) selected from the second signal lines 19, as are minimally connected the source terminals of the two input switching transistors 51 (j) and 53 (j), the drain terminals of the input switching transistors 51 (j) and 53 (j) having separately connected to them a capacitor 55 (j) and 57 (j), respectively, these drain terminals also being connected, via a separately provided plurality of impedance conversion means 54a and 54b, to the input sections of a plurality of switching means 21a and 21b, which form the switching means 52. The outputs of the switching means 21a and 21b are connected to the plurality of output means 35a and 35b, and these switching means 21a and 21b are simultaneously operated by the common control means 25 (j).

Additionally, in this embodiment, of the two input switching transistors 51 (j) and 53 (j), the gate terminal of switching transistor 51 (j) is connected to the first input switching signal line 32, and the gate terminal of the other switching transistor 53 (j) is connected to the second input switching signal line 34, the drive of the first and second input switching signal lines 32 and 34 being controlled by an appropriate control means S3.

In either of the above-described embodiments, at one selected group of signal line, for example 15 (j), for a selected single signal line 15 (1), it is desirable that the separate signal line be the signal line 15 (2), that is, it is preferable in the present invention that, when the separate signal line is selected, it is selected as a signal line that is adjacent to the first selected signal line.

An embodiment of the image pick-up device 100 according to the present invention is described below, with reference being made to the relevant drawings.

In the embodiment described below, the description of configuration, operation, and timing applies to the case in which one signal line that is to be selected, that is, the first signal line, is selected by specifying a row signal line, this being a vertical gate line 15, by means of the first selection circuit means, this being a vertical scanning circuit 17, and specifying a column signal line, this being a vertical signal line 19, by means of the second selection circuit means, this being a horizontal scanning circuit 27, it will be apparent that this is not a restriction placed on the present invention by the embodiments, and it is also possible to adopt other selection combinations.

Figure 3:
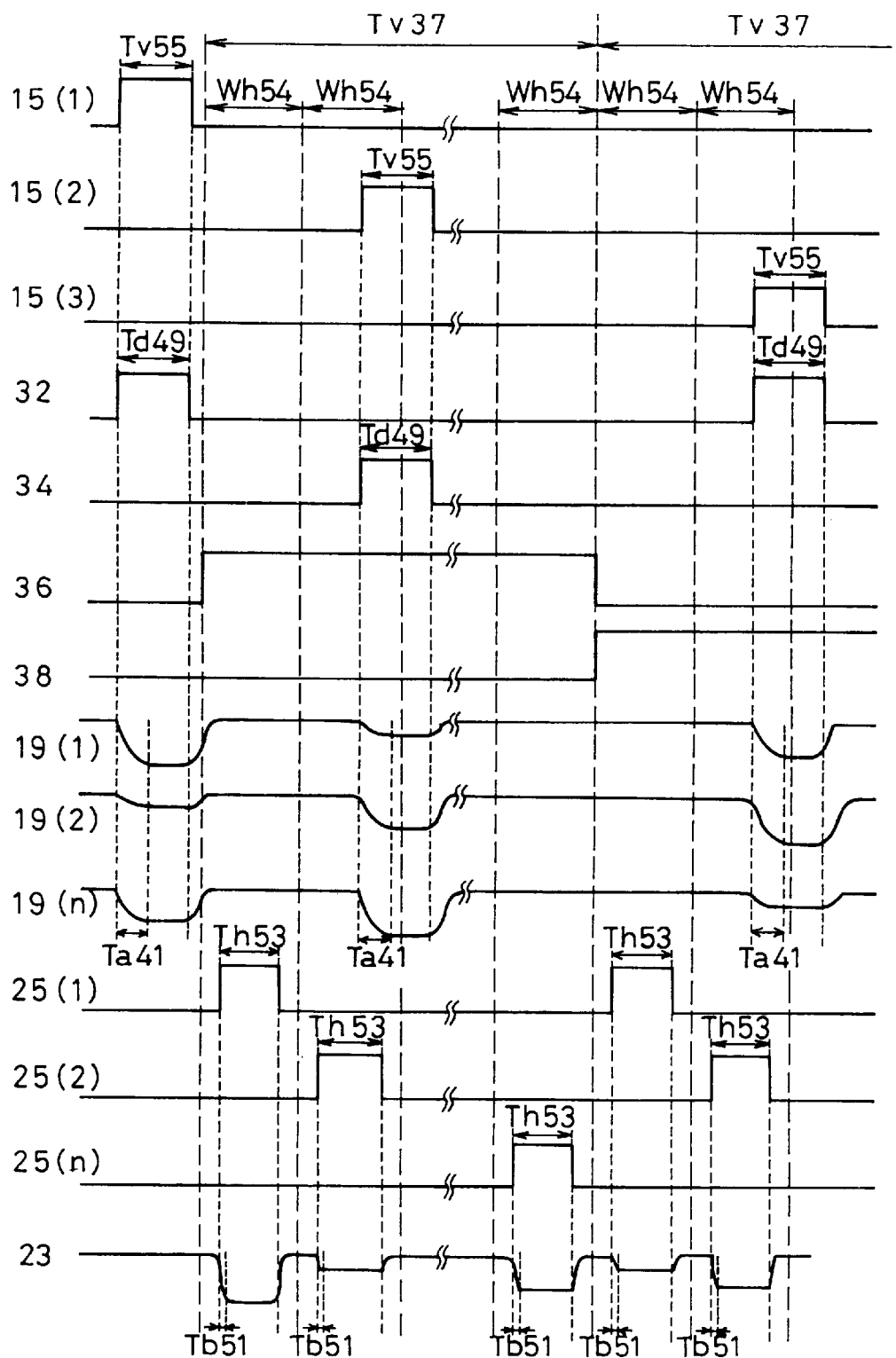
FIG. 3 is a timing diagram that illustrates the drive method for an image pick-up device according to the present invention.
Figure 4:
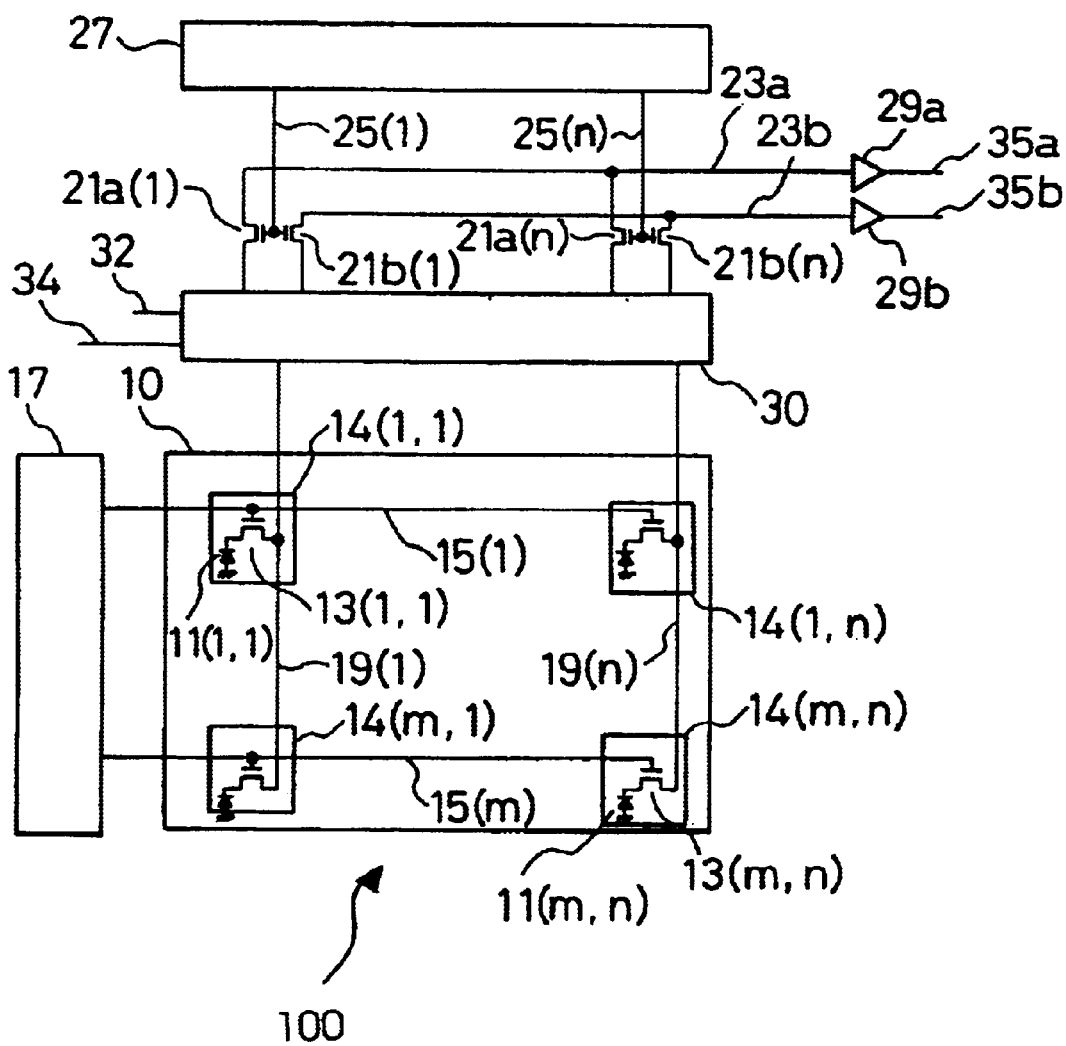
FIG. 4 is a block diagram that shows the configuration of another example of an image pick-up device according to the present invention.
Figure 6:
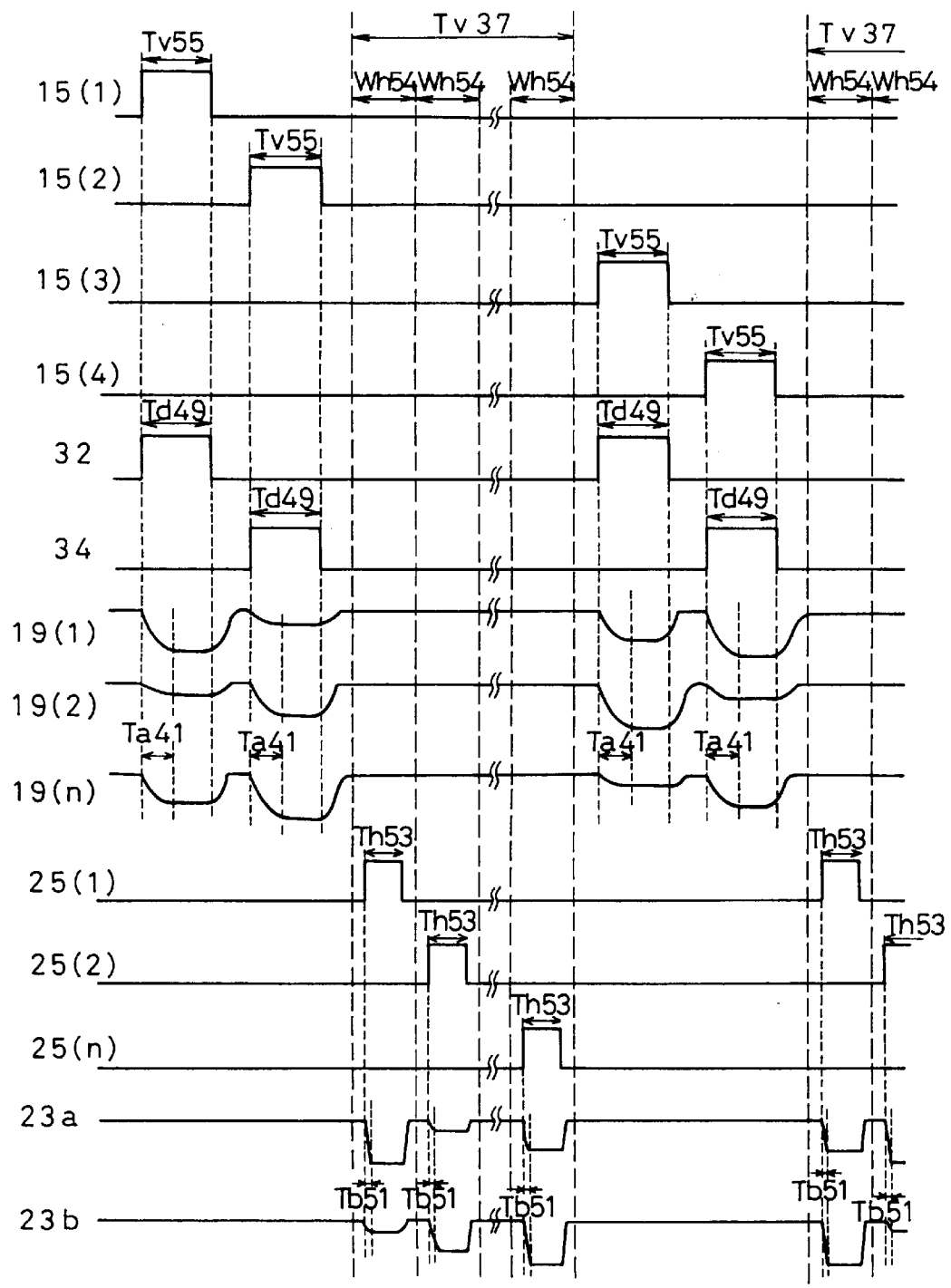
FIG. 6 is a timing diagram that illustrates the drive method for another example of an image pick-up device according to the present invention.

FIG. 1 is a drawing that shows the circuit configuration of the first embodiment of the present invention. FIG. 2 is a detailed drawing of a circuit embodiment for the purpose of implementing the circuit configuration that is shown in FIG. 1. FIG. 3 is a timing diagram that illustrates the method of driving the embodiment that is shown in FIG. 1. FIG. 4 is a drawing that shows the circuit configuration of the second embodiment of the present invention. FIG. 5 is a detailed circuit embodiment for the purpose of implementing the circuit configuration that is shown in FIG. 4. FIG. 6 is a timing diagram that illustrates the method of driving the embodiment that is shown in FIG. 4. First, the circuit configuration of the first embodiment of the present invention will be described, with reference being made to FIG. 1.

In the photoelectrical conversion element cell array 10 of the MOS solid-state image pick-up device 100, each of the photoelectrical conversion element cells 14 (i, j) (i=1, 2, ..., m and j=1, 2, ..., n), comprising the photoelectrical conversion elements 11 (i, j) (i=1, 2, ..., m and j=1, 2, ..., n) and the enhancement-type n-channel MOS vertical switching transistors 13 (i, j) (i=1, 2, ..., m and j=1, 2, ..., n), the source of which being connected to the photoelectrical conversion elements 11 (i, j), are arranged in an m-row, n-column matrix arrangement.

The respective gate terminals of these vertical switching MOS transistors 13 (i, j) are connected in common for each row in the photoelectrical conversion element cell array 10 to vertical gate lines 15 (i) (i=1, 2, ..., m), each of these in turn being connected to the vertical scanning circuit 17.

The drain terminals of the vertical switching MOS transistors 13 (i, j) are connected in common to the vertical signal lines 19 (j) (j=1, 2, ..., n) for each column. Each of the vertical signal lines 19 (j) is connected to the source of the horizontal switching enhancement-type n-channel MOS transistor 21 (j) (j=1, 2, ..., n), via the multiple signal line received light amount value storage means 30, all of the drain terminals of these horizontal switching enhancement-type n-channel MOS transistors 21 (j) (j=1, 2, ..., n) being connected in common to the horizontal signal output line 23.

The multiple signal line received light amount value storage means 30 has connected to it the first input switching signal line 32, the second input switching signal line 34, the first output switching signal line 36, and the second output switching signal line 38.

In the above-noted embodiment, the first input switching signal line 32 and first output switching signal line 36 form, for example, a first control means S1 and the second input switching signal line 34 and second output switching signal line 38 form, for example, the second control means S2.

Each of the gate terminals of the horizontal switching MOS transistors 21 (j) are connected to horizontal scanning circuit 27, which is the second selection circuit, via the horizontal gate line 25 (j) (j=1, 2, ..., n). The horizontal signal output line 23 is connected to the input of the signal amplifier circuit 29, and the output of this signal amplifier circuit 29 is connected to the output signal line 35.

Next, a circuit embodiment of the multiple signal line received light amount value storage means 30 will be described in detail, with reference being made to FIG. 2.

Each of the vertical signal lines 19 (i) has connected to it one of the multiple signal line received light amount value storage means 30 (j=1, 2, ..., n).

The vertical signal line 19 (j) is connected to the readout load resistors 31 (j) (j=1, 2, ..., n), the source terminal of the enhancement type n-channel MOS transistor 51 (j) (j=1, 2, ..., n) that forms the input switching first switching means, and the source terminal of the enhancement-type n-channel MOS transistor 53 (j) (j=1, 2, ..., n) that forms the input switching second switching means.

The other end of the readout load resistor 31 (j) is connected to the constant-voltage VM power supply 33. The other end of this constant voltage VM power supply 33 is connected to the ground (GND) level.

The readout load resistor 31 (j) and the above-noted constant-voltage VM power supply 33 form the voltage detection means 50 of the present invention.

The constant-voltage VM power supply 33 is fully in common within a multiple signal line received light amount value storage means 30 (j).

The drain terminal of the MOS transistor 51 (j) is connected to the capacitor 55 (j) (j=1, 2, ..., n) and to the source terminal of the enhancement-type n-channel MOS transistor 59 (j) (j=1, 2, ..., n) that forms the output switching first switching means, and the drain terminal of the MOS transistor 53 (j) connected to the capacitor 57 (j) (j=1, 2, ..., n) and to the source terminals of the enhancement-type n-channel MOS transistor 61 (j) (j=1, 2, ..., n) that forms the output switching second switching means.

The other end of the capacitor 55 (j) and the other end of the capacitor 57 (j) are connected to the ground level.

The drain terminal of the MOS transistor 59 (j) and the drain terminal of the MOS transistor 61 (j) are connected in common to the impedance conversion circuit 54 (j) (j=1, 2, ..., n).

The output of the impedance conversion circuit 54 (j) is connected as the output of the multiple signal line received light amount value storage means 30 to the drain terminal of the MOS transistor 21 (j) that forms the horizontal switching means 52.

The gate terminal of the MOS transistor 51 (j) is connected to the first input switching signal line 32, and the gate terminal of the MOS transistor 53 (j) is connected to the second input switching signal line 34, while the gate terminal of the MOS transistor 59 (j) is connected to the first output switching signal line 36 and the gate terminal of the MOS transistor 61 (j) is connected to the second output switching signal line 38.

As noted above, the first input switching signal line 32 and the first output switching signal line 36 form the first control means S1, while the second input switching signal line 34 and the second output switching signal line 38 form the second control means S2, an appropriate control signal that is output from an appropriate control circuit means (not shown) arbitrarily selecting either the first control means S1 or the second control means S2, so that there is simultaneous selection of either the input switching signal means or the output switching signal means.

The impedance conversion circuit 54 (j) need not have the action of amplification, it being sufficient that it provide a low-impedance output. This, for example, can be a general buffer circuit, such as the series connection of an enhancement-type n-channel transistor and a depression-type n-channel transistor, so as to form a general type of source-follower configuration.

It is sufficient that the signal amplifier circuit 29 have an analog amplification action, and this can be a general type of analog amplifier, such as an operational amplifier.

The MOS transistor 51 (j), MOS transistor 53 (j), MOS transistor 59 (j), and MOS transistor 61 (j) are merely switches, and can be a general type of transmission gate circuit, such as a combination of an enhancement-type p-channel MOS transistor and an enhancement-type n-channel MOS transistor.

While the photoelectrical conversion element cells 14 (i, j) that are used in the MOS solid-state image pick-up device according to the present invention are a general passive type, formed by an photoelectrical conversion element 11 (i, j) and a MOS transistor 13 (i, j), the photoelectrical conversion element cell 14 (i, j) that is used in the MOS solid-state image pick-up device according to the present invention can also be an active type photoelectrical conversion element cell that has one photoelectrical conversion element and one or more MOS transistors.

Figure 7:
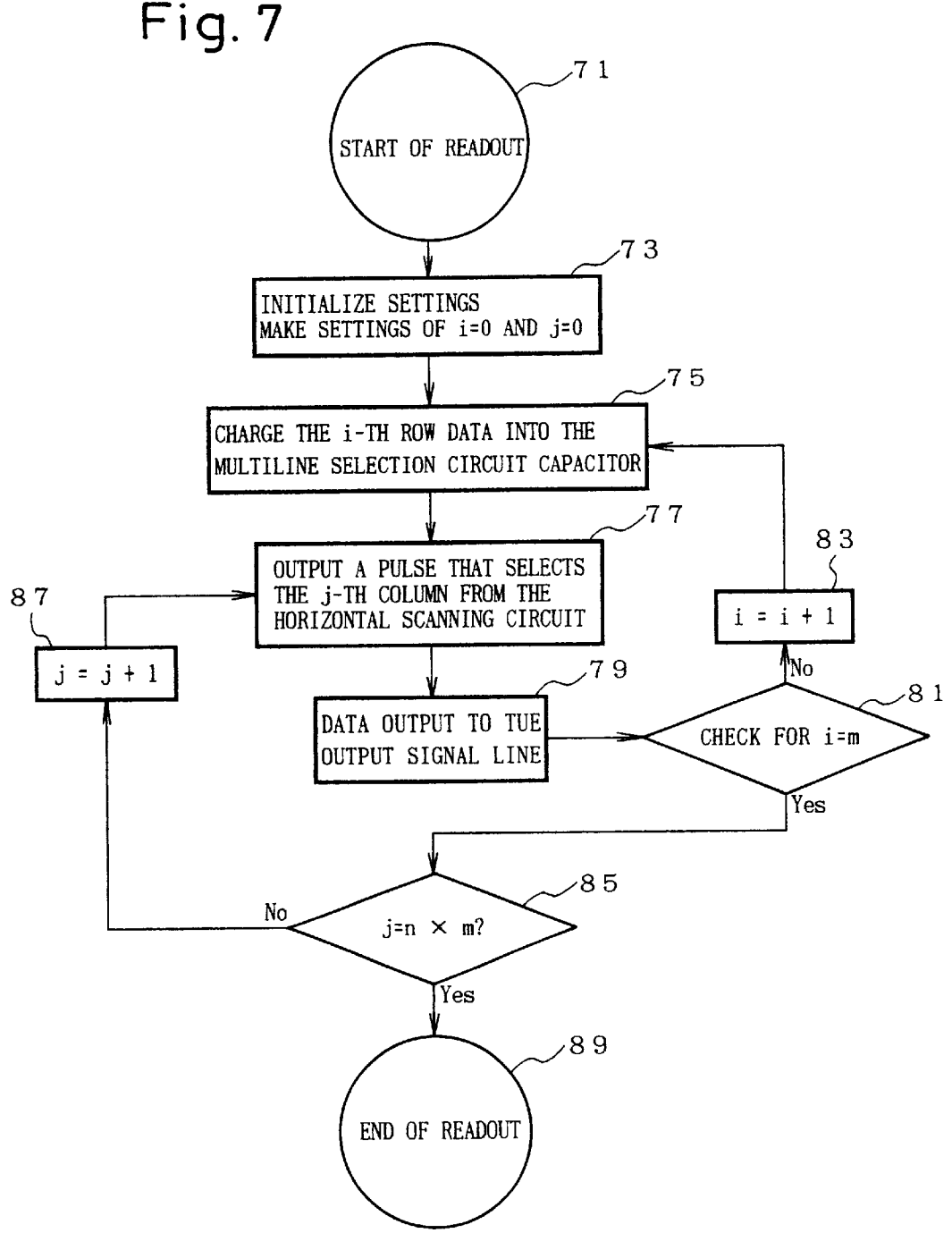
FIG. 7 is a flowchart that illustrates the operating procedure in an example of an image pick-up device according to the present invention.

Next, the, method of driving an image pick-up device according to the present invention will be described, with reference being made to FIG. 7.

First, at the start of readout of each photoelectrical conversion element cell 14 at step 71, initial value settings of the horizontal scanning circuit 27 and vertical scanning circuit 17 are made as i=0 and j=0 (step 73).

Next, at step 75, a scan of the i-th row of data is stored into a capacitor in each of the multiple signal line received light amount value storage means 30 is executed.

Then, at the step 77, the operation of outputting a pulse from the horizontal scanning circuit 27 that selects the column signal line 19 (j), which is the j-th column signal line, is executed, and control proceeds to step 79, at which the operation of outputting data to the output signal line 35 is executed.

During the execution of the operation of step 79, at step 81 the operation of checking for the condition i=m is performed one time only and, if i has not reached m, at step 83 the incrementing operation of i=i+1 is executed and return is made to step 75, from which the above-noted operations starting at the operation of the i-th row of data is stored into a capacitor of the multiple signal line received light amount value storage means 30 are repeated.

That is, during the readout of the i-th row of data, the data for i+1-throw is stored into the capacitors of this multiple signal line received light amount value storage means 30.

Then, at step 81, if the judgment i=m is made, control proceeds to step 85, at which point a check is made for the condition j=n×m.

That is, from the horizontal shift circuit 27, n×m pulses are output continuously, this being the total number of photoelectrical conversion element cells.

At step 85, if the judgment is that j has not reached n×m, at step 87, the incrementing operation of j=j+1 is performed, and return is made to step 77, from which the above operation is repeated.

When the judgment that j=n×m is made at step 85, the readout of all the photoelectrical conversion element cells has been completed, and the subroutine is ended.

Next, the readout drive method for this MOS solid-state image pick-up device 100 will be described in detail, with reference being made to FIG. 1, FIG. 2, and FIG. 3.

First, before reading out the amount of light impinging on the photoelectrical conversion elements 11 (1, 1) to 11 (m, n) from the image pick-up device 100, the potential of each of the photoelectrical conversion elements 11 (1, 1) to 11 (m, n) and the sources of the vertical switching MOS transistors 13 (1, 1) to 13 (m, n) are held at the voltage of VM supplied from the power supply 33.

In this condition, if light is received, a photoelectric current that is proportional to the amount of received light is generated within each of the photoelectrical conversion elements 11 (i, j), the result being that the source potential of the vertical switching MOS transistors 13 (i, j) is lowered from the constant voltage VM by an amount that is proportional to the amount of light.

Next, when the vertical scanning circuit 17 applies a positive-voltage pulse to the vertical gate line 15 (1) of the vertical gate lines 15 (1) through 15 (m), for which i=1, the n vertical switching MOS transistors 13 (1, 1) to 13 (1, n) are switched on so as to conduct, the result being that the source potentials of the n vertical switching MOS transistors 13 (1, 1) to 13 (1, n) appear all at once at the n vertical signal lines 19 (1) to 19 (n).

A positive-voltage pulse is further applied to the first input switching signal line 32, thereby switching the MOS transistors 51 (1) to 51 (n) from off to on.

The vertical signal lines 19 (1) to 19 (n) have connected to them one end of the readout load resistors 31 (1) to 31 (n), the other ends of these readout load resistors 31 (1) to 31 (n) being connected to the power supply 33 that supplies a constant voltage of VM, so that a current that is proportional to the voltage drop caused by the light impinging on the photoelectrical conversion elements 11 (1, 1) to 11 (1, n) flows in the vertical signal lines 19 (1) to 19 (n).

Then, the capacitors 55 (1) to 55 (n) are charged to the potentials of the vertical signal lines 19 (1) to 19 (n), via the MOS transistors 51 (1) to 51 (n).

Next, the vertical gate line 15 (1) and first input switching signal line 32 pulse are set to the ground level so as to turn all of the vertical switching MOS transistors 13 (1) to 13 (n) and MOS transistors 51 (1) to 51 (n) off at once, thereby isolating one end of the capacitors 55 (1) to 55 (n) from the vertical signal lines 19 (1) to 19 (n). A positive-voltage pulse is applied to the first output switching signal line 36 to switch the MOS transistors 59 (1) to 59 (n) from off to on, thereby connecting one end of the capacitors 55 (1) to 55 (n) to the impedance conversion circuits 54 (1) to 54 (n).

The potential to which the capacitors 55 (1) to 55 (n) are charged are output to the source terminals of the horizontal switching MOS transistors 21 (1) to 21 (n), via the outputs of the impedance conversion circuits 54 (1) to 54 (n).

Additionally, with a positive voltage remaining on the first output switching signal line 36, a positive-voltage pulse is sequentially applied from the horizontal scanning circuit 27 to the horizontal gate lines 25 (1) to 25 (n), thereby sequentially turning the horizontal switching MOS transistors 21 (1) to 21 (n) from on to off, so that the outputs of the impedance conversion circuits 54 (1) to 54 (n) are sequentially input to the horizontal signal output line 23, which is the input to the signal amplifier circuit 29, these being amplified by the signal amplifier circuit 29 and output to the output signal line 35.

In this manner, it is possible to know, as voltage values, the amounts of light that impinge upon the photoelectrical conversion elements 11 (1, 1) to 11 (1, n).

Additionally, with a positive voltage remaining on the first output switching line 36, during the sequential application of a positive-voltage pulse from the horizontal scanning circuit 27 to the horizontal gate lines 25 (1) to 25 (n), a positive-voltage pulse is applied to the vertical gate signal line 15 (i) (i=1, m) for which i=2 and the second input switching signal line 34, thereby causing conduction between the vertical switching MOS transistors 13 (2, 1) to 13 (2, n) and the MOS transistors 53 (1) to 53 (n).

One end of the readout load resistors 31 (1) to 31 (n) is connected to the respective vertical signal lines 19 (1) to 19 (n), the other ends of these readout load resistors 31 (1) to 31 (n) being connected to the power supply 33, which supplies the constant voltage VM, so that a current that is proportional to the voltage drop caused by the light impinging on the photoelectrical conversion elements 11 (2, 1) to 11 (2, n) flows into the vertical signal lines 19 (1) to 19 (n).

Then, these currents are converted to voltages by the readout load resistors 31 (1) to 31 (n), thereby causing voltages to appear at the vertical signal lines 19 (1) to 19 (n) that are proportional to the amount of light impinging upon the photoelectrical conversion elements 11 (2, 1) to 11 (2, n).

The capacitors 57 (1) to 57 (n) are charged to the potentials of the vertical signal lines 19 (1) to 19 (n) via the MOS transistors 53 (1) to 53 (n).

Next, the vertical gate line 15 (2) and the second input switching signal line 34 are set to the ground level, so as to turn all of the vertical switching MOS transistors 13 (1) to 13 (n) and MOS transistors 53 (1) to 53 (n) off at once, thereby isolating one end of the capacitors 57 (1) to 57 (n) from the vertical signal lines 19 (1) to 19 (n).

Then, n positive-voltage pulses from the horizontal scanning circuit 27 are output to the horizontal gate lines 25 (1) to 25 (n) and, when this has been completed, after the completion of outputting of voltage values to the horizontal signal line 23 that are proportional to the light impinging on the photoelectrical conversion elements 11 (1, 1) to 11 (1, n), the first output switching signal line 36 is changed from the positive voltage to the ground level, and the MOS transistors 59 (1) to 59 (n) are set to off, thereby isolating the capacitors 55 (1) to 55 (n) from the impedance conversion circuits 54 (1) to 54 (n).

Next, a positive-voltage pulse is applied to the second output switching signal line 38, thereby switching the MOS transistors 61 (1) to 61 (n) from off to on, and connecting one end of the capacitors 57 (1) to 57 (n) to the impedance conversion circuits 54 (1) to 54 (n).

The potentials to which the capacitors 57 (1) to 57 (n) are charged are each output via the impedance conversion circuits 54 (1) to 54 (n), respectively, and are output to the source terminals of the horizontal switching MOS transistors 21 (1) to 21 (n).

With a positive voltage remaining on the second output switching signal line 38, when a positive-voltage pulse is sequentially applied from the horizontal scanning circuit 27 to the horizontal gate lines 25 (1) to 25 (n), the n horizontal switching MOS transistors 21 (1) to 21 (n) are sequentially switched from on to off, so that the outputs of the impedance conversion circuits 54 (1) to 54 (n) are sequentially input to the horizontal signal output line 23, which is the input to the signal amplifier circuit 29, these being amplified by the signal amplifier circuit 29 and output to the output signal line 35.

In this manner, it is possible to know the amount of light impinging on the photoelectrical conversion elements 11 (2, 1) to 11 (2, n) of the second row of the photoelectrical conversion element array 10 as voltage values.

By repeating the above-described operations, it is possible to know the amount of light impinging on all of the photoelectrical conversion elements 11 (i, j) (i=1, 2, . . . , m and j=1, 2, . . . , n) of the photoelectrical conversion element array 10.

Next, the operational timing of reading out the amount of light impinging on the photoelectrical conversion element array 10 will be described in detail, with reference being made to the timing diagram of FIG. 3.

First, a positive-voltage pulse from the vertical scanning circuit 17 is output to the vertical gate line 15 (1) with a pulse width of Tv 55. During the period Tv 55 in which this vertical gate line 15 (1) is at the high level, the first input switching signal line 32 is at a high level for just the period of the pulse width Td 49.

Because the vertical gate line 15 (1) changes to the high level, after the time period Ta 41, voltages that are proportional to the amounts of current that flow into each of the photoelectrical conversion elements 11 (1, 1) to 11 (1, n) appear at the vertical signal lines 19 (1) to 19 (n) and, by the first input switching signal line 32 changing to the high level, the capacitors 55 (1) to 55 (n) are charged to these voltages, via the MOS transistors 51 (1) to 51 (n), respectively.

After voltages that are proportional to the amount of current that flows into the photoelectrical conversion elements 11 (1, 1) to 11 (1, n) have been stored in the capacitors 55 (1) to 55 (n), the first input switching signal line 32 and the vertical gate line 15 (1) are set to the ground level.

Next, a positive-voltage pulse having a width of Tv 37 appears on the first output switching signal line 36 and, during this time period Tv 37, n pulses Th 53 are sequentially output from the horizontal scanning circuit 27 to the horizontal gate lines 25 (1) to 25 (n), these having a period of Wh 54.

At the horizontal signal output line 23, which is the input to the signal amplifier circuit 29, when the time Tb 51 elapses after each of the signal lines 25 (1) to 25 (n) changes to the high level, the voltages that are proportional to the currents that flow into each of the photoelectrical conversion elements 11 (1, 1) to 11 (1, n), which were stored in the capacitors 55 (1) to 55 (n), are output. These are amplified by the signal amplifier circuit 29, and output to the output signal line 35.

In the period of time Tv 37, during which voltages proportional to the amount of current flowing into the photoelectrical conversion elements 11 (1, 1) to 11 (1, n) are output to the output signal line 35, a positive-voltage pulse with a width of Tv 55 is output to the vertical gate line 15 (2).

During the period Tv 55 in which this vertical gate line 15 (2) is at the high level, the second input switching signal line 34 is at the high level, for the period of the pulse width Td 49.

By this vertical gate line 15 (2) changing to the high level, voltages that are proportional to the amount of current flowing into each of the photoelectrical conversion elements 11 (2, 1) to 11 (2, n) appear at the vertical signal lines 19 (1) to 19 (n), and by the second input switching signal line 34 changing to the high level, the capacitors 57 (1) to 57 (n) are charged to these voltages, via the MOS transistors 53 (1) to 53 (n).

When the charging of the capacitors 57 (1) to 57(n) to the voltages that are proportional to the currents flowing into the photoelectrical conversion elements 11 (2, 1) to 11 (2, n) is completed, the second input switching signal line 34 and the vertical gate line 15 (2) are set to the ground level.

The period of pulse width Tv 37, during which the first output switching signal line 36 is a positive-voltage pulse, is completed, and n positive-voltage pulses having a pulse width of Th 53 with a period of Wh 54 are sequentially output from the horizontal scanning circuit 27. When this output is completed, the first output switching signal line 36 is set to the ground level, so that the MOS transistors 59 (1) to 59 (n) are switched off, the result being that the capacitors 55 (1) to 55 (n) are isolated from the impedance conversion circuits 54 (1) to 54 (n).

Next, a positive-voltage pulse having a pulse width of Tv 37 appears on the second output switching signal 38, and within this pulse width Tv 37 n positive-voltage pulses having a pulse width of Th 53 are sequentially output to the horizontal gate lines 25 (1) to 25 (n) from the horizontal scanning circuit 27.

After a time of Tb 51 after each of the signal lines 25 (1) to 25 (n) changes to high level, voltages that are proportional to the currents that flow into the photoelectrical conversion elements 11 (2, 1) to 11 (2, n) which were stored in the capacitors 57 (1) to 57 (n) are output to the horizontal signal output line 23, which is the input to the signal amplifier circuit 29, these being amplified by the signal amplifier circuit 29 and output to the output signal line 35.

That is, with a period of Wh 54, n×m Th 53 pulses are continuously output to the horizontal gate lines 25 (1) to 25 (n) from the horizontal scanning circuit 27.

The period Ta 41 is the period of time from the point at which the vertical switching MOS transistor 13 (i, j) is turned on by the vertical gate line 15 (i), until the current that flows into the photoelectrical conversion element 11 (i, j) is converted to a voltage by the readout load resistor 31 (i), and this voltage is used to charge either the capacitor 55 (j) or the capacitor 57 (j).

The period Tb 51 is the period of time from the point at which the horizontal switching MOS transistor 21 (i) is turned on by the horizontal gate line 25 (i), until the output of the impedance conversion circuit 51 (i) is output to the horizontal signal output line 23.

Because the on resistance of the vertical switching MOS transistor 13 (i, j) is high, the time Ta 41 is long, so that a significant amount of time is required for the charging of the capacitor 55 (j) or 57 (j). However, to read out the amount of current that flows into the i-th row photoelectrical conversion elements 11 (i, 1) to 11 (i, n), it is only necessary to output a long Tv 55 high-level pulse that is longer than Ta 41 one time, a pulse that is made high level during the period of Td 49 being output to the first input switching signal line 32 or second input switching signal line 34.

Because of the low output impedance of the impedance conversion circuits 54 (1) to 54 (n), the output signals of the impedance conversion circuits 54 (1) to 54 (n) that appear on the horizontal signal output line 23 appear very quickly on the horizontal signal output line 23 with a time of Tb 51, when the horizontal switching MOS transistors 21 (1) to 21 (n) are switched on.

Therefore, Ta 41>>Tb 51 and is possible to satisfy the condition Td 49>>Th 53.

Thus, the time required for readout of all the photoelectrical conversion elements is Td 49+(Th 53×n).

Figure 10:
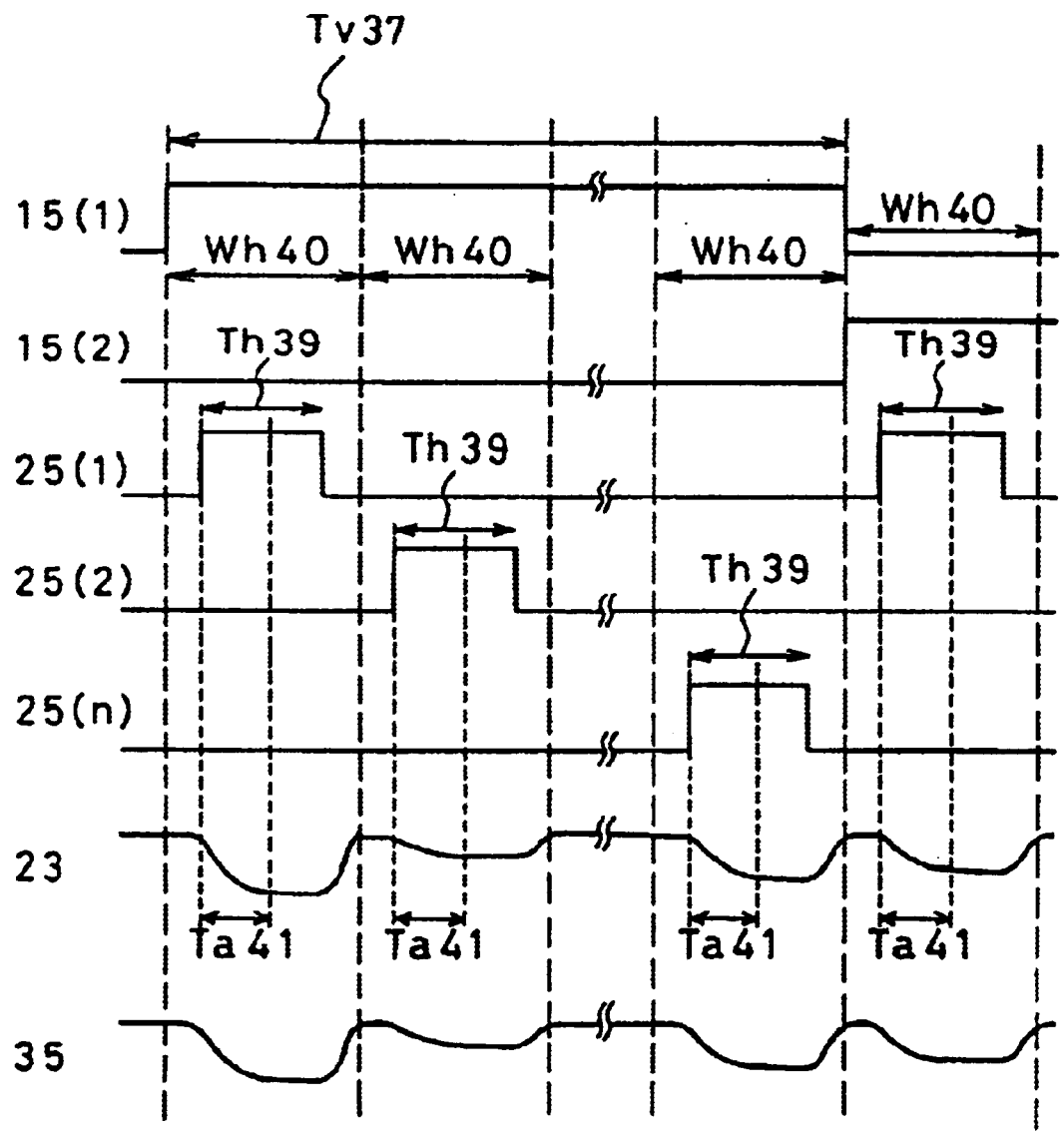
FIG. 10 is a timing diagram that illustrates a prior art method of driving an image pick-up device.

Compared to the time period Th 39 of FIG. 10, which illustrates the readout timing of the photoelectrical conversion elements in a prior art MOS solid-state image pick-up device, because Th 53 is much shorter, according to the present invention, the amount of time required for readout of the amount of light impinging on all the photoelectrical conversion elements is extremely short.

Next, the circuit configuration of a second embodiment of the present invention will be described, with reference being made to FIG. 4 and FIG. 5.

In the photoelectrical conversion element cell array 10 of the MOS solid-state image pick-up device 100, the photoelectrical conversion element cells 14 (i, j) (i=1, 2, . . . , m and j=1, 2, . . . , n), the sources of the enhancement-type n-channel MOS vertical switching transistors 13 (i, j) (i=1, 2, . . . , m and j=1, 2, . . . , n) of which are connected to the photoelectrical conversion elements 11 (i, j) (i=1, 2, . . . , m and j=1, 2, . . . , n), are arranged in an m-row, n-column matrix arrangement.

The respective gate terminals of these vertical switching MOS transistors 13 (i, j) are connected in common for each row in the photoelectrical conversion element cell array 10 to the vertical scanning circuit 17.

The drain terminals of the vertical switching MOS transistors 13 (i, j) are each connected in common for each column to the vertical signal lines 19 (j) (j=1, 2, ..., n).

Each of the vertical signal lines 19 (j) is connected to the source terminals of the horizontal switching enhancement-type n-channel MOS transistors 21a (j) (j=1, 2, ..., n) and 21b (j) (j=1, 2, ..., n), via a multiple signal line received light amount value storage means 30, the drain terminals of all the horizontal switching MOS transistors 21a being connected to a common horizontal signal output line 23a, and the drain terminals of all the horizontal MOS switching transistors 21b being connected to a common horizontal signal output line 23b.

The multiple signal line received light amount value storage means 30 has connected to it a first input switching signal line 32 and a second input switching signal line 34.

The gate terminals of the horizontal switching MOS transistors 21a (j) and the other horizontal switching MOS transistors 21b (j) are connected in common, via the horizontal gate lines 25 (j), to the horizontal scanning circuit 27.

The horizontal signal output line 23a is connected to the input of a signal amplifier 29a, the output of which is connected to the output signal line 35a. The other horizontal signal output line 23b is connected to the input of a signal amplifier 29b, the output of which is connected to the output signal line 35b.

Next, a circuit embodiment of the multiple signal line received light amount value storage means 30 will be presented, with reference being made to FIG. 5.

Each vertical signal line 19 (i) is connected individually to a multiple signal line received light amount value storage means 30 (j). The vertical signal lines 19 (j) are respectively connected to the readout load resistors 31 (j) (j=1, 2, ..., n), to the source terminals of enhancement-type n-channel MOS transistors 51 (j) (j=1, 2, ..., n), and to the source terminals of the enhancement-type n-channel MOS transistors 53 (j) (j=1, 2, ..., n).

The other ends of the readout load resistors 31 (j) are connected to a power supply 33 that supplies a constant voltage VM. The other end of the constant-voltage VM power supply 33 is connected to the ground (GND) level. The power supplies 33 are common within the multiple signal line received light amount value storage means 30 (j).

The readout load resistor 31 (j) and the constant-voltage VM power supply 33 form a voltage detection circuit 50.

Additionally, the drain terminal of the MOS transistor 51 (j) is connected to the capacitor 55 (j) (j=1, 2, ..., n) and to the input terminal of the impedance conversion circuit 54a (j) (j=1, 2, ..., n), and the drain terminal of the MOS transistors 53 (j) is connected to the capacitor 57 (j) (j=1, 2, ..., n) and the impedance conversion circuit 54b (j) (j=1, 2, ..., n).

The other end of the capacitor 55 (j) and the other end of the capacitor 57 (j) are connected to the ground level.

The output of the impedance conversion circuit 54a (j) is connected to the source terminal of the horizontal switching MOS transistor 21a (j) and the output of the impedance conversion circuit 54b (j) is connected to the source terminal of the horizontal switching MOS transistor 21b (j).

The gate terminal of the MOS transistor 51 (j) is connected to the first input switching signal line 32, and the gate terminal of the MOS transistor 53 (j) is connected to the second input switching signal line 34.

The impedance conversion circuit 54a (j) and the impedance conversion circuit 54b (j) are impedance conversion circuits having exactly the same characteristics. These circuits do not need to have an amplification action, it being sufficient that they provide a low-impedance output. They can be, for example, general buffer circuits, such as a series connection of an enhancement-type n-channel transistor and a depression-type n-channel transistor, so as to form a general type of source-follower configuration. It is sufficient that the signal amplifier circuits 29a and 29b have an analog amplification action, and this can be achieved by a general type of analog amplifier, such as an operational amplifier.

The MOS transistors 51 (j) and MOS transistor 53 (j) are merely switches, and can be a general type of transmission gate circuit, such as a combination of an enhancement-type p-channel MOS transistor and an enhancement-type n-channel MOS transistor.

While the photoelectrical conversion element cells 14 (i, j) that are used in the MOS solid-state image pick-up device according to the present invention are a general passive type, formed by an photoelectrical conversion element 11 (i, j) and a MOS transistor 13 (i, j), the photoelectrical conversion element cell 14 (i, j) that is used in the MOS solid-state image pick-up device according to the present invention can also be an active type photoelectrical conversion element cell that has one photoelectrical conversion element and one or more MOS transistors.

Figure 8:
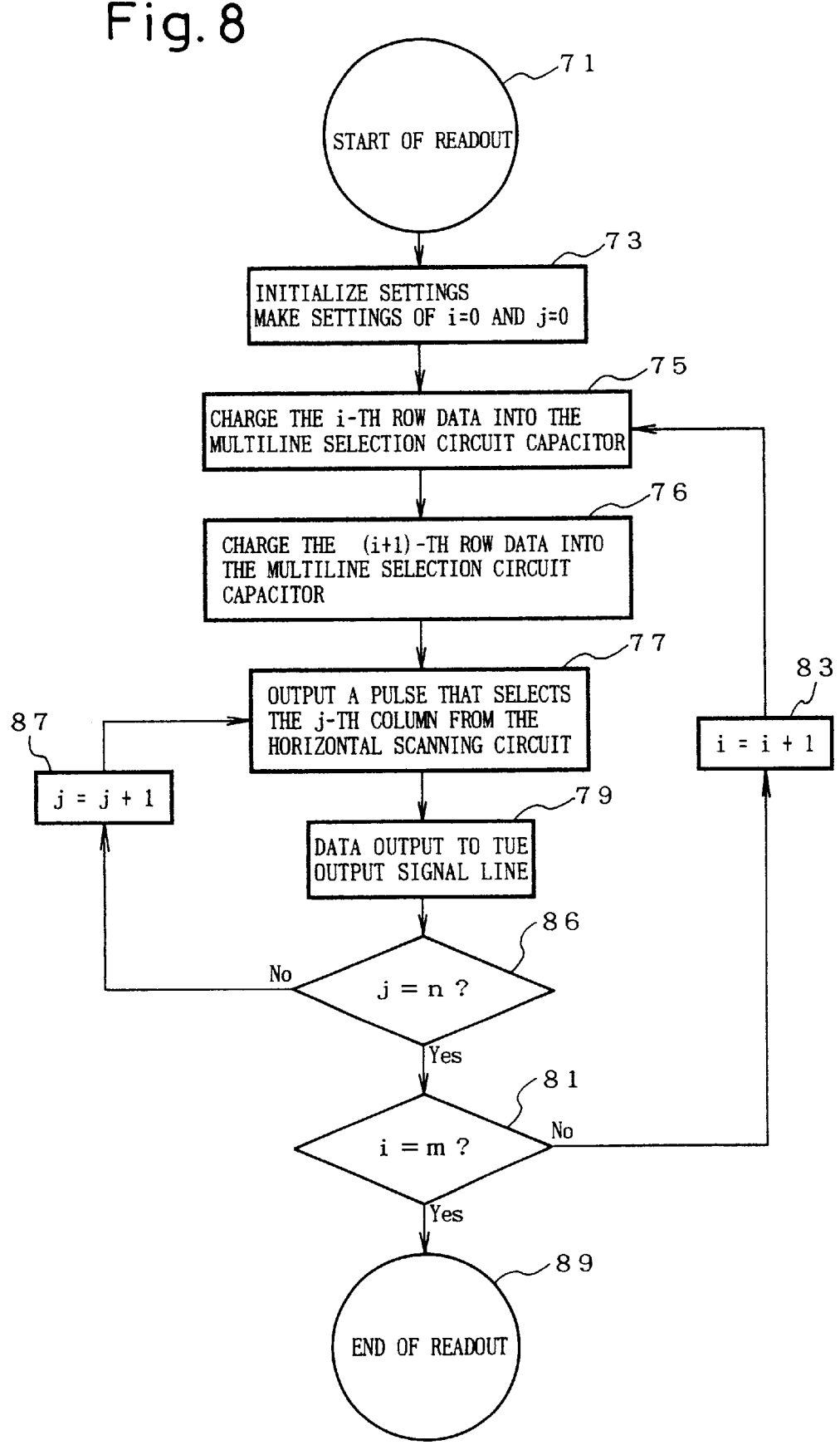
FIG. 8 is a flowchart that illustrates the operating procedure in another example of an image pick-up device according to the present invention.
Figure 9:
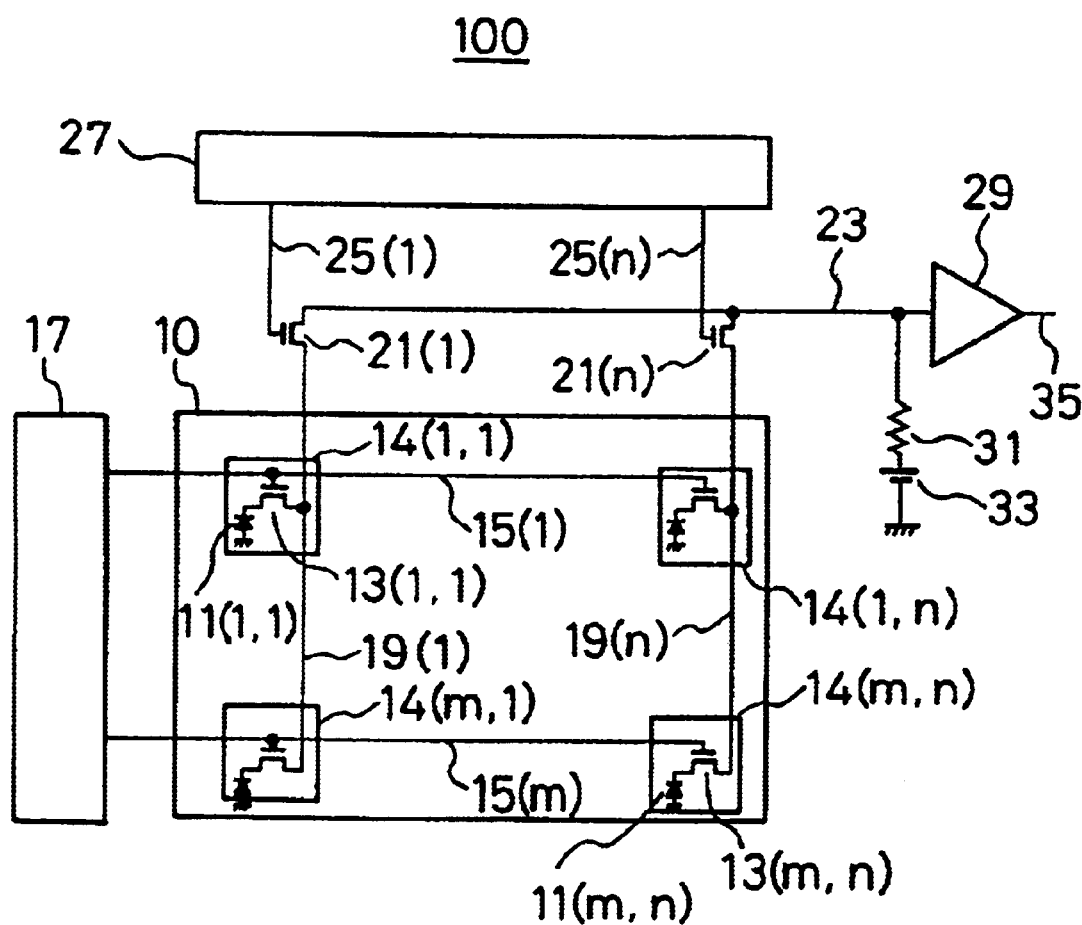
FIG. 9 is a block diagram that shows the configuration of an example of a prior art image pick-up device.

Next, the method of driving an image pick-up device according to the present invention will be described, with reference being made to FIG. 8.

First, at the start of readout of each photoelectrical conversion element cell 14 at step 71, initial value settings of the horizontal scanning circuit and vertical scanning circuit are made as i=0 and j=0 (step 73).

Next, at step 75, an operation of the i-th row data is stored into a capacitor in each of the multiple signal line received light amount value storage means 30 is executed, after which control proceeds to step 76, at which the operation of storing the data for the i+1 row into the capacitors of the multiple signal line received light amount value storage means 30.

Then at step 77, the operation of outputting a pulse from the horizontal scanning circuit 27 that selects the column signal line j, which is the j-th signal line, is executed, and control proceeds to step 79, at which the operation of outputting data to the output signal line is executed.

Next, control proceeds to step 86, at which a check for the condition of j=n is made and, if the judgment is that j has not yet reached n, at step 87 the incrementing operation of j=j+1 is executed, after which return is made to step 77, from which the operation of outputting a pulse from the horizontal scanning circuit that selects that the j-th column is executed once again.

If at step 86 the judgment is made that j=n, control proceeds to step 81, at which a check is made for the condition i=m and, if the judgment is made that i has not yet reached m, at step 83 an incrementing operation of i=i+1 is performed, and return is made to step 75, from which the above-noted operations are repeated.

If at step 81 the judgment is made that i=m, at step 89 the readout is ended, this completing the readout of all the photoelectrical conversion element cells.

Next, the readout drive method for this MOS solid-state image pick-up device 100 of the above-noted second embodiment will be described in detail, with reference being made to FIG. 4, FIG. 5, and FIG. 6.

First, before reading out the amount of light impinging on the photoelectrical conversion elements 11 (1, 1) to 11 (m, n) from the image pick-up device 100, the potential of each of the photoelectrical conversion elements 11 (1, 1) to 11 (m, n) and the sources of the vertical switching MOS transistors 13 (1, 1) to 13 (m, n) are held at the voltage of VM supplied from the power supply 33.

In this condition, if light is received, a photoelectric current that is proportional to the amount of received light is generated within each of the photoelectrical conversion elements 11 (i, j), the result being that the source potential of the vertical switching MOS transistors 13 (i, j) is lowered from the constant voltage VM by an amount that is proportional to the amount of light.

Next, when the vertical scanning circuit 17 applies a positive voltage pulse to the vertical gate line 15 (1) of the vertical gate lines 15 (1) to 15 (m) for which i=1, the vertical switching MOS transistors 13 (1,1) to 13 (1, n) are switched on so as to conduct, the result being that the source potentials of the n vertical switching MOS transistors 13 (1, 1) to 13 (1, n) appear all at once at the n vertical signal lines 19 (1) to 19 (n).

A positive-voltage pulse is further applied to the first input switching signal line 32, thereby switching the MOS transistors 51 (1) to 51 (n) from off to on.

The vertical signal lines 19 (1) to 19 (n) have connected to them one end of the readout load resistors 31 (1) to 31 (n), respectively, the other ends of these readout load resistors 31 (1) to 31 (n) being connected to the power supply 33 that supplies a constant voltage of VM, so that a current that is proportional to the voltage drop caused by the light impinging on the photoelectrical conversion elements 11 (1, 1) to 11 (1, n) flows in the vertical signal lines 19 (1) to 19 (n).

This current is converted to a voltage by the readout load resistors 31 (1) to 31 (n), a voltage that is proportional to the light impinging on each of the photoelectrical conversion elements 11 (1, 1) to 11 (1, n) appearing at the vertical signal lines 19 (1) to 19 (n).

The capacitors 55 (1) to 55 (n) are charged to the potentials of the vertical signal lines 19 (1) to 19 (n) via the MOS transistors 51 (1) to 51 (n), simultaneously with which input is made to the impedance conversion circuits 54a (1) to 54a (n), and also output is made to the source terminals of the horizontal switching MOS transistors 21a (1) to 21a (n).

The vertical gate line 15 (1) and the first input switching signal line 32 are set to the ground level, so that the vertical switching MOS transistors 13 (1) to 13 (n) and the MOS transistors 51 (1) to 51 (n) are set to off all at once, thereby isolating one end of the capacitors 55 (1) to 55 (n) from the vertical signal lines 19 (1) to 19 (n).

Next, when a positive-voltage pulse is applied to the vertical gate line 15 (2) which is the vertical gate line of 15 (1) to 15 (n) for which i=2, the n vertical switching MOS transistors 13 (2, 1) to 13 (2, n) are set to on, so as to conduct, the result being that the source potentials of the n vertical switching MOS transistors 13 (2, 1) to 13 (2, n) appear at once at the n vertical signal lines 19 (1) to 19 (n).

A positive-voltage pulse is additionally applied to the second input switching signal line 34, so as to switch the MOS transistors 53 (1) to 53 (n) from off to on.

One end of the readout load resistors 31 (1) to 31 (n) is connected to respective vertical signal lines 19 (1) to 19 (n), the other end of each of these readout load resistors 31 (1) to 31 (n) being connected to the power supply 33, which supplies the constant voltage VM, the result being that currents that are proportional to voltage drops due to the amounts of light impinging on the photoelectrical conversion elements 11 (2, 1) to 11 (2, n) flow into the vertical signal lines 19 (1) to 19 (n).

These currents are converted to voltages by the readout load resistors 31 (1) to 31 (n), so that potentials that are proportional to the amount of light impinging on each of the photoelectrical conversion elements 11 (2, 1) to 11 (2, n) appear at the vertical signal lines 19 (1) to 19 (n).

The capacitors 57 (1) to 57 (n) are charged, via the MOS transistors 53 (1) to 53 (n) to the potentials of the vertical signal lines 19 (1) to 19 (n), input thereof being made to the impedance conversion circuits 54b (1) to 54b (n), and output being made therefrom to the source terminals of the horizontal switching MOS transistors 21b (1) to 21b (n).

The vertical gate line 15 (2) and the second input switching signal line 34 are set to the ground level, the result being that the vertical switching MOS transistors 13 (1) to 13 (n) and the MOS transistors 53 (1) to 53 (n) are all set to off at once, thereby isolating one end of the capacitors 57 (1) to 57 (n) from the vertical signal lines 19 (1) to 19 (n).

If a positive-voltage pulse is applied from the horizontal scanning circuit 27 sequentially to the horizontal gate lines 25 (1) to 25 (n), the horizontal switching MOS transistors 21a (1) to 21a (n) and MOS transistors 21b (1) to 21b (n) will be sequentially switched from on to off, so that the outputs of the impedance conversion circuits 54a (1) to 54a (n) are sequentially input to the horizontal output line 23a, which is the input to the signal amplifier 29a, amplified by the signal amplifier 29a, and output to the output signal line 35a.

Simultaneous with the above, the outputs of the impedance conversion circuits 54b (1) to 54b (n) are sequentially input to the horizontal signal output line 23b, which is the input to the signal amplifier 29b, amplified by this amplifier 29b, and output to the output signal line 35b.

In this manner, it is possible to know the amounts of light that impinge on each of the photoelectrical conversion elements 11 (1, 1) to 11 (1, n) as voltage values that appear at the output signal line 35a, and simultaneously to know the amounts of light that impinge on each of the photoelectrical conversion elements 11 (2, 1) to 11 (2, n) as voltage values that appear at the output signal line 35b.

Then, after the output from the horizontal scanning circuit 27 of n positive-voltage pulses to the horizontal gate lines 25a (1) to 25a (n) and 25b (1) to 25b (n), and the output of the amount of light impinging on the photoelectrical conversion elements 11 (1, 1) to 11 (1, n) and photoelectrical conversion elements 11 (2, 1) to 11 (2, n) as voltage values to the horizontal signal lines 23a and 23b is completed, by repeating the above-noted operations it is possible to know the amount of light impinging on all the photoelectrical conversion elements 11 (i, j), where i=1 to m and j=1 to n.

Next, the operational timing of the circuit when reading out the amount of light impinging on the photoelectrical conversion element array 10 of the image pick-up device 100 according to the present invention will be described in detail, with reference being made to the timing diagram presented in FIG. 6.

First, a positive-voltage pulse from the vertical scanning circuit 17 is output to the vertical gate line 15 (1), with a pulse width of Tv 55. During the period Tv 55 in which this vertical gate line 15 (1) is at the high level, the first input switching line 32 is at a high level for just the period of the pulse width Td 49.

Because the vertical gate line 15 (1) changes to the high level, after the time period Ta 41, voltages that are proportional to the amounts of current that flow into each of the photoelectrical conversion elements 11 (1, 1) to 11 (1, n) appear at the vertical signal lines 19 (1) to 19 (n) and, by the first input switching signal line 32 changing to the high level, the capacitors 55 (1) to 55 (n) are charged to these voltages, via the MOS transistors 51 (1) to 51 (n), respectively, these being output from the impedance conversion circuits 54*a* (1) to 54*a* (n) and input to the source terminals of the horizontal switching MOS transistors 21*a* (1) to 21*a* (n).

When the charging of the capacitors 55 (1) to 55 (n) to voltages that are proportional to the currents that flow into the photoelectrical conversion elements 11 (1,1) to 11 (1, n) is completed, the first input switching signal line 32 and the vertical gate line 15 (1) are set to the ground level.

Next, the vertical scanning circuit 17 outputs a positive-voltage pulse having a pulse width of Tv 55 to the vertical gate line 15 (2).

During the period of time Tv 55, in which the vertical gate line 15 (2) is at the high level, the second input switching signal line 34 is at a high level for the period of time of the pulse width Td 49.

By the vertical gate line 15 (2) changing to the high level, after the time Ta 41, voltages that are proportional to the amount of current that flows into each of the photoelectrical conversion elements 11 (2, 1) to 11 (2, n) appear at the vertical signal lines 19 (1) to 19 (n), and additionally by the first input switching signal line 32 changing to the high level the capacitors 57 (1) to 57 (n) are charged to these voltages, via the MOS transistors 53 (1) to 53 (n), these being output from the impedance conversion circuits 54*b* (1) to 54*b* (n) to the source terminals of the horizontal switching MOS transistors 21*b* (1) to 21*b* (n).

When the charging of the capacitors 57 (1) to 57 (n) to voltages that are proportional to the amounts of current flowing into the photoelectrical conversion elements 11 (2, 1) to 11 (2, n) is completed, the second input switching signal line 34 and the vertical gate line 15 (2) are set to the ground level.

Then, within the time period of Tv 37, n positive-voltage pulses having a pulse width of Th 53 are sequentially output from the horizontal scanning circuit 27 to the horizontal gate lines 25 (1) to 25 (n) with a period of Wh 54.

After the time period Tb 51 after each of the signal lines 25 (1) to 25 (n) from the horizontal scanning circuit 27 change to the high level, voltages that are proportional to the amounts of current that flow into the photoelectrical conversion elements 11 (1, 1) to 11 (1, n) and which were stored in the capacitors 55 (1) to 55 (n) appear at the horizontal signal output line 23*a*, which is the input to the signal amplifier circuit 29*a*.

Then, these voltages are amplified by the signal amplifier circuit 29*a* and output to the output signal line 35*a*.

Simultaneous with the above operation, after the time period Tb 51 after each of the signal lines 25 (1) to 25 (n) from the horizontal scanning circuit 27 change to the high level, voltages that are proportional to the amounts of current that flow into the photoelectrical conversion elements 11 (2, 1) to 11 (2, n) and which were stored in the capacitors 57 (1) to 57 (n) appear at the horizontal signal output line 23*b*, which is the input to the signal amplifier circuit 29*b*, which amplifies these voltages and outputs them to the output signal line 35*b*.

Then, when the sequential output of n positive-voltage pulses having a pulse width of Th 53 from the vertical scanning circuit 17 to the horizontal gate lines 25 (1) to 25 (n) with a period of Wh 54 is completed, the vertical scanning circuit 17 outputs a positive-voltage pulse having a pulse width of Tv 55 to the vertical gate line 15 (3).

During the period of time Tv 55 in which the vertical gate line 15 (3) is at the high level, the first input switching signal line 32 is at the high level for the period of the pulse width Td 49.

By this vertical gate line 15 (3) changing to the high level, after the time Ta 41 voltages that are proportional to the amounts of current flowing into each of the photoelectrical conversion elements 11 (3, 1) to 11 (3, n) appear at the vertical signal lines 19 (1) to 19 (n), and by the first input switching signal line 32 changing to the high level, the capacitors 55 (1) to 55 (n) are charges to these voltages via the MOS transistors 51 (1) to 51 (n), respectively, these voltages then being output from the impedance conversion circuits 54*a* (1) to 54*a* (n) to the source terminals of the horizontal switching MOS transistors 21*a* (1) to 21*a* (n).

When the charging of the capacitors 55 (1) to 55 (n) to voltages proportional to the amounts of current flowing into the photoelectrical conversion elements 11 (3, 1) to 11 (3, n) is completed, the first input switching signal line 32 and the vertical gate line 15 (3) are set to the ground level.

Next, a positive-voltage pulse from the vertical scanning circuit 17 is output to the vertical gate line 15 (4) with a pulse width of Tv 55.

The vertical gate line 15 (4) is at the high level for the period of Tv 55, and the second input switching signal line 34 is at the high level for just the pulse width of Td 49.

By the vertical gate line 15 (4) changing to the high level, after the time Ta 41, voltages that are proportional to the amounts of currents flowing into each of the photoelectrical conversion elements 11 (4, 1) to 11 (4, n), respectively, appear at the vertical signal lines 19 (1) to 19 (n) and, by the first input switching signal line changing to the high level, the capacitors 57 (1) to 57 (n) are charged to these voltage via the MOS transistors 53 (1) to 53 (n), respectively, the voltages being output from the impedance conversion circuits 54*b* (1) to 54*b* (n) to the source terminals of the horizontal switching MOS transistors 21*b* (1) to 21*b* (n).

When the charging of the capacitors 57 (1) to 57 (n) to voltages that are proportional to the amounts of currents flowing into each of the photoelectrical conversion elements 11 (4, 1) to 11 (4, n) is completed, the second input switching signal line 34 and the vertical gate line 15 (2) are set to the ground level.

Then, within the time period of Tv 37, n positive-voltage pulses having a pulse width Th 53 are sequentially output from the horizontal scanning circuit 27 to the horizontal gate lines 25 (1) to 25 (n), with a period of Wh 54.

After the time of Tb 51 after each of the signal lines 25 (1) to 25 (n) from the horizontal scanning circuit 27 changes to the high level, a voltage that is proportional to the current flowing into the photoelectrical conversion elements 11 (3, 1) to 11 (3, n), respectively, is output at the horizontal signal output line 23*a*, which is the input to the signal amplifier circuit 29*a*.

Then, these voltages are amplified by the signal amplifier circuit 29*a* and output to the output signal line 35*a*.

Simultaneously with the above-noted operation, after the time Tb 51 after each of the signal lines 25 (1) to 25 (n) from the horizontal scanning circuit 27 changes to the high level, a voltage that is proportional to the current flowing into the photoelectrical conversion elements 11 (4, 1) to 11 (4, n), respectively, is output at the horizontal signal output line 23b, which is the input to the signal amplifier circuit 29b. Then, these voltages are amplified by the signal amplifier circuit 29b and output to the output signal line 35b.

That is, by applying n positive-voltage pulses sequentially to the horizontal gate lines 25 (1) to 25 (n) from the horizontal scanning circuit 27, voltages which are proportional to the current flowing into two rows of the photoelectrical conversion element array 10 are output respectively to the output signal lines 35a and 35b.

In the above procedure, the time Ta 41 after the vertical switching MOS transistor (i, j) is switched on by the vertical gate line 15 (i), until the current flowing into the photoelectrical conversion element 11 (i, j) is converted to a voltage by the readout load resistor 31 (i), and the capacitor 55 (j) or 57 (j) is charged to this voltage.

Further, in the above procedure, the time Tb 51 after the horizontal switching MOS transistors 21a (i) and 21b (i) are turned on by the horizontal gate line 25 (i), until the output of the impedance conversion circuits 54a (i) and 54b (i) is made to the horizontal signal output lines 23a and 23b.

Because the on resistance of the vertical switching MOS transistor 13 (i, j) is high, the time Ta 41 is long, so that some time is required for the charging of the capacitor 55 (j) or 57 (j). However, to read out the amounts of current flowing into each of the photoelectrical conversion elements 11 (i, 1) to 11 (i, n) for a selected i-th row, it is sufficient to output to the vertical gate line 15 (i) a high-level pulse of width Tv 55 that is longer than Ta 41 just one time, and within this time period, it is sufficient to output to either the first input switching signal line 32 or the second input switching signal line 34 a high-level pulse of a width Td 49.

Additionally, because the output impedance of the impedance conversion circuits 54a (j) and 54b (j) is low, the output signals from these impedance conversion circuits 54a (j) and 54b (j), which appear at the horizontal signal output line 23, appear at the horizontal signal output lines 23a and 23b very quickly, with a time of Tb 51, after the horizontal switching MOS transistors 21 (1) to 21 (n) are turned on.

Therefore, Ta 41>>Tb 51 and it is possible to satisfy the condition Td 49>>Th 53.

The minimum time, therefore, required for the readout of all the photoelectrical conversion elements would be at least ((Ta 41×2)+Tb 51×n)×(m/2).

Thus, compared to the time period Th 39 of FIG. 10 which illustrates the readout timing of the photoelectrical conversion elements in a prior art MOS solid-state image pick-up device, because Th 53 is much shorter, according to the present invention, the amount of time required for readout of the amount of light impinging on all the photoelectrical conversion elements is extremely short.

A method of driving an image pick-up device 100 according to the present invention, which is formed by first signal lines, second signal lines that are disposed so as to intersect with the first signal lines in a matrix arrangement, a first selection circuit that selectively drives in sequence the first signal lines, a second selection circuit that selectively drives in sequence the second signal lines, a plurality of photoelectrical conversion element cell that are disposed in the region of the intersection points between the first signal lines and the second signal lines, and which are each connected to these signal lines, and an output means that separately outputs individual amount of light information for the photoelectrical conversion element cell is a drive method whereby, by scanning each of either the first signal lines or the second signal lines, the operations of reading out the amount of received light information for a plurality of photoelectrical conversion element cell connected to the other selected signal lines and the outputting the results of this readout operation to the output means. In this drive method, within the period of time for scanning each of signal lines of the above-noted one set of signal lines, an operation of reading out the respective amount of received light information for the plurality of photoelectrical conversion element cells connected to at least two signal lines selected from the other set of signal lines and the operations of outputting this amount of received light information are performed simultaneously or consecutively.

A specific aspect of the above-noted method of driving a solid-state image pick-up device according to the present, which is for example formed by first signal lines, second signal lines that are disposed so as to intersect with the first signal lines in a matrix arrangement, a first selection circuit that selectively drives in sequence the first signal lines, a second selection circuit that selectively drives in sequence the second signal lines, a plurality of photoelectrical conversion element cell that are disposed in the region of the intersection points between the first signal lines and the second signal lines, and which are each connected to these signal lines, and an output means that separately outputs individual amount of light information for the photoelectrical conversion element cell, wherein the configuration is such that, selecting part of either the first signal lines or the second signal lines, the individual amount of received light information for a plurality of photoelectrical conversion element cells connected to the selected signal lines is output and, by sequentially scanning the other signal lines, the individual amount of received light information for the read out photoelectrical conversion element cells is sequentially and individually output to the above-noted output means, is a drive method whereby one signal line of one of the signal lines is selected and, during the period of time in which the amount of received light information for a plurality of photoelectrical conversion element cells connected to the thus selected signal line is being output to the output means, another signal line of the other signal lines is selected, so as read out the amount of received light information of a plurality of photoelectrical conversion element cells connected thereto.

Another aspect of a method of driving a solid-state image pick-up device according to the present, which is for example formed by first signal lines, second signal lines that are disposed so as to intersect with the first signal lines in a matrix arrangement, a first selection circuit that selectively drives in sequence the first signal lines, a second selection circuit that selectively drives in sequence the second signal lines, a plurality of photoelectrical conversion element cell that are disposed in the region of the intersection points between the first signal lines and the second signal lines, and which are each connected to these signal lines, and an output means that separately outputs individual amount of light information for the photoelectrical conversion element cell, wherein the configuration is such that, selecting part of either the first signal lines or the second signal lines, the individual amount of received light information for a plurality of photoelectrical conversion element cells connected to the selected signal lines is output and, by sequentially scanning the other signal lines, the individual amount of received light information for the read out photoelectrical conversion element cells is sequentially and individually output to the above-noted output means, the a plurality of the above-noted output means being provided in parallel, is a drive method whereby one signal line of one of the signal lines is selected and the individual amount of received light information for the plurality of photoelectrical conversion element cells connected to the selected signal is read out, whereupon another signal line of the above-noted set of signal lines is selected, so as to read out the individual amount of received light of the plurality of photoelectrical conversion element cells connected to this other signal line, the individual amount of received light of the plurality of photoelectrical conversion element cells connected to the one signal line of the one group of signal lines and the individual amount of received light of the plurality of photoelectrical conversion element cells connected to the other signal line of the one group of signal lines being simultaneously and individually output to individual output means of the plurality of output means.

By adopting the technical constitution described in detail above, an image pick-up device according to the present invention, in comparison with an image pick-up device of the past, enables a great reduction in the amount of time required to read the amount of light from the photoelectrical conversion elements, thereby enabling the execution of high-speed image processing using this image pick-up device.

What is claimed is:

1. A solid-state image pick-up device comprising:
   a first group of signal lines;
   a second group of signal lines, each of which intersecting those of said first group of signal lines in a matrix arrangement;
   a first selection circuit that sequentially selects and drives said first group of signal lines;
   a second selection circuit that sequentially selects and drives said second group of signal lines;
   a plurality of photoelectrical conversion element cells that are provided in the vicinity of each one of a region of intersection points formed between each one of lines of said first group of signal lines and each one of lines of said second group of signal lines, and that are connected thereto; and
   at least an output means for separately outputting individual amounts of received light information of said photoelectrical conversion element cells; and
   wherein said device further comprising;
   a multiple signal line received light amount value storage means which is provided separately between either said first group or said second group of signal lines and a prescribed selection circuit which drives said selected group of signal lines and which is provided on each one of said signal lines in said selected group of signal lines, and which individually stores therein, an amount of received light information of each one of a plurality of photoelectrical conversion element cells, each connected to a selected one of said separate signal lines contained in another group of signal lines, respectively, while each of said plurality of multiple signal line received light amount value storage means is further provided with an amount of received light detection means, each of which reads out, respectively, for each one of said signal lines in said another group of signal lines, said amounts or received light information of each one of said plurality of photoelectrical conversion element cells connected to a selected one of said separate signal lines contained in said another group of signal lines; and
   a switching means that causes said detected amount of received light information to be transmitted to said output means.

2. A solid-state image pick-up device according to claim 1, wherein said amount of received light detection means comprises a voltage conversion means that converts to a voltage value an amount of current that is generated in said photoelectrical conversion element cells in response to an amount of received light at said photoelectrical conversion element cells, which are connected to selected prescribed signal lines of said another group of signal lines.

3. A solid-state image pick-up device according to claim 2, wherein said multiple signal line received light amount value storage means comprises a plurality of voltage value storage means that store values of voltage that are detected by voltage detection means that comprises said voltage conversion means, respectively, these being provided in correspondence with individual photoelectrical conversion element cells that are connected to a plurality of selected signal lines selected from signal lines of another group of signal lines.

4. A solid-state image pick-up device according to claim 3, wherein said plurality of voltage value storage means in said multiple signal line received light amount value storage means, are provided separately so as to correspond to each one of a plurality of signal lines in said another group of signal lines.

5. A solid-state image pick-up device according to claim 3, wherein said voltage value storage means comprises a capacitor, one end of which being connected to a signal line of said selected group of signal lines, while the other end of which being connected to ground.

6. A solid-state image pick-up device according to claim 3, wherein said voltage detection means is a resistance, the other end of which is connected to a common constant-voltage power supply.

7. A solid-state image pick-up device according to any one of claim 1 through claim 6, wherein said photoelectrical conversion element cell comprises at least one photoelectrical conversion element and at least one transistor.

8. A solid-state image pick-up device according to claim 7, wherein said transistor is a MOSFET transistor.

9. A solid-state image pick-up device according to any one of claim 1 to claim 8, wherein said switching means is formed by a MOSFET transistor.

10. A solid-state image pick-up device according to any one of claim 1 to claim 9, wherein said first group of signal lines are row signal lines, and said second group of signal lines are column signal lines.

11. A solid-state image pick-up device according to any one of claim 1 to claim 10, wherein said output means is provided singularly.

12. A solid-state image pick-up device according to any one of claim 1 to claim 10, wherein at least two said output means are provided in parallel.

13. A solid-state image pick-up device according to claim 11, wherein said multiple signal line received light amount value storage means comprises a plurality of control means pairs each of which comprising an input signal switching means and an output signal switching means.

14. A solid-state image pick-up device according to claim 13, wherein said multiple signal line received light amount value storage means is configured so that, by selecting one of said plurality of control means, voltage values of individual photoelectrical conversion element cells that are connected to one of said signal lines of said another group of signal lines, are stored in a voltage value storage means which is selected from a plurality of said voltage value storage means.

15. A solid-state image pick-up device according to claim 14, wherein said device being configured so that by switching said plurality of control means pairs, voltage values of individual photoelectrical conversion element cells that are connected to separate signal line of said another group of signal lines are stored into a separate voltage value storage means within said plurality of voltage value storage means.

16. A solid-state image pick-up device according to any one of claim 13 to claim 15, wherein said multible signal line received light amount value storage means is configured so that, by selecting any one of said plurality of control means pairs, a voltage value that is stored in a selected said voltage value storage means of said plurality of voltage value storage means is output via said switching means to said output means.

17. A solid-state image pick-up device according to any one of claim 13 to claim 16, wherein said plurality of control means pairs are provided in common to each of the multiple signal line received light amount value storage means provided in each one of said signal lines of said selected group of signal lines.

18. A solid-state image pick-up device according to any one of claim 1 to claim 11 or any one of claim 13 to claim 17, wherein said switching means is driven and controlled by an output signal from said selection circuits that sequentially drive and selects one of said signal lines of said selected group of signal lines.

19. A solid-state image pick-up device according to any one of claim 1 to claim 11 or any one of claim 13 to 18, wherein said switching means and said multiple signal line received light amount value storage means are connected to one another via an impedance conversion means or buffer means in said multiple signal line received light amount value storage means.

20. A solid-state image pick-up device according to any one of claims 3 to 5, wherein one end of said respective voltage detection means is connected to each one of said signal lines of said selected group of signal lines, the output end of said switching means being connected to said common output means, and a control terminal of said switching means being connected to a control signal output terminal of a selection circuit that sequentially and selectively drives each one of said signal lines of said selected group of signal lines.

21. A solid-state image pick-up device comprising:
a first group of signal lines; a second group of signal lines, each of which intersecting those of said first group of signal lines in a matrix arrangement;
a first selection circuit that sequentially selects and drives said first group of signal lines;
a second selection circuit that sequentially selects and drives said second group of signal lines;
a plurality of photoelectrical conversion element cells that are provided in the vicinity of each one of a region of intersection points formed between each one of lines of said first group of signal lines and each one of lines of said second group of signal lines, and that are connected thereto;
at least an output means for separately outputting individual amounts of received light information of said photoelectrical conversion element cells;
a multiple signal line received light amount value storage means which is provided separately between either said first group or said second group of signal lines and a prescribed selection circuit which drives said selected group of signal lines and which is provided on each one of said signal lines in said selected group of signal lines, and which individually stores therein, an amount of received light information of each one of a plurality of photoelectrical conversion element cells, each connected to a selected one of said separate signal lines contained in another group of signal lines, respectively, while each of said plurality of multiple signal line received light amount value storage means is further provided with an amount of received light detection means, each of which reads out, respectively, for each one of said signal lines in said another group of signal lines, said amounts of received light information of each one of said plurality of photoelectrical conversion element cells connected to a selected one of said separate signal lines contained in said another group of signal lines; and a switching means that causes said detected amount of received light information to be transmitted to said output means; wherein;
said image pick-up device being configured so that, by selecting a part of signal lines of either one of said first or said second group of signal lines, individual amount of received light information for each of said plurality of photoelectrical conversion element cells, each connected to each one of said signal lines of said selected group of signal lines, is read out, while by sequentially scanning each one of said signal lines in the another group of signal lines, said individual amount of received light information read out from each one of said read photoelectrical conversion element cells is sequentially and separately output to said output means, respectively, wherein in said device, during a period of time in which one of said signal lines of said selected group of signal lines is selected and individual amount of received light information for each one of said plurality of photoelectrical conversion element cells each connected to one of said selected signal line of said selected group of signal lines is output to said output means, by selecting a separate signal line of said selected group of signal lines, individual amount of received light information for a plurality of photoelectrical conversion element cells each connected to said separate signal line of said selected group of signal lines is read out.

22. A solid-state image pick-up device according to claim 21, wherein said multiple signal line received light amount value storage means comprises a plurality of control means pairs each of which being provided with an input signal switching means and an output signal switching means.

23. A solid-state image pick-up device according to claim 22, wherein said multiple signal line received light amount value storage means is configured so that, by selecting any one of said plurality of control means pairs, voltage values of individual photoelectrical conversion element cells that are connected to one of said signal lines of said selected group of signal lines is stored in a selected voltage value storage means of said plurality of voltage value storage means, respectively.

24. A solid-state image pick-up device according to claim 23, wherein said multiple signal line received light amount value storage means is configured so that by switching said plurality of control means pairs, voltage values of individual photoelectrical conversion element cells that is connected to separate signal line of said another group of signal lines is stored into separate voltage value storage means within said plurality of voltage value storage means, respectively.

25. A solid-state image pick-up device according to either claim 11 or any one of claim 22 to claim 24, wherein said multiple signal line received light amount value storage means is configured so that individual voltage values that are stored in each one of said plurality of voltage value storage means of said multiple signal line received light amount value storage means, respectively, are selectively and consecutively output to said output means, via said switching means.

26. A solid-state image pick-up device according to any one of claim 22 to claim 25, wherein each one of said plurality of control means pairs is provided in common to each of the multiple signal line received light amount value storage means provided in each one of signal lines of said selected group of signal lines, respectively.

27. A solid-state image pick-up device according to claim 3, wherein each of said plurality of voltage value storage means is connected to a common impedance conversion means via a plurality of output switching means that is provided separately and in parallel, said common impedance conversion means being connected to said output means via said switching means, and said plurality of switching means operating simultaneously so as to selectively output a voltage value stored in one of said voltage value storage means in accordance with said common control means.

28. A solid-state image pick-up device according to claim 27, wherein said control means of said switching means is driven and controlled by an output signal from said selection circuits that selectively and sequentially drive each one of said signal lines of said selected group of signal lines.

29. A solid-state image pick-up device according to any one of claim 13 to claim 28, wherein said separate signal line of said selected group of signal lines is a signal line that is adjacent to said first selected signal line which is selected from said selected group of signal lines, when the selection of a signal line is performed.

30. A solid-state image pick-up device comprising:
- a first group of signal lines;
- a second group of signal lines, each of which intersecting those of said first group of signal lines in a matrix arrangement;
- a first selection circuit that sequentially selects and drives said first group of signal lines;
- a second selection circuit that sequentially selects and drives said second group of signal lines;
- a plurality of photoelectrical conversion element cells that are provided in the vicinity of each one of a region of intersection points formed between each one of lines of said first group of signal lines and each one of lines of said second group of signal lines, and that are connected thereto;
- at least an output means for separately outputting individual amounts of received light information of said photoelectrical conversion element cells;
- a multiple signal line received light amount value storage means which is provided separately between either said first group or said second group of signal lines and a prescribed selection circuit which drives said selected group of signal lines and which is provided on each one of said signal lines in said selected group of signal lines, and which individually stores therein, an amount of received light information of each one of a plurality of photoelectrical conversion element cells, each connected to a selected one of said separate signal lines contained in another group of signal lines, respectively, while each of said plurality of multiple signal line received light amount value storage means is further provided with an amount of received light detection means, each of which reads out, respectively, for each one of said signal lines in said another group of signal lines, said amounts of received light information of each one of said plurality of photoelectrical conversion element cells connected to a selected one of said separate signal lines contained in said another group of signal lines; and
- a switching means that causes said detected amount of received light information to be transmitted to said output means, wherein, said image pick-up device being configured so that, a plurality of said output means being parallely provided to form a multi-step like configuration, and said device being further configured so that, after a signal line of said selected group of signal lines is selected therefrom, and individual amount of received light information for a plurality of photoelectrical conversion element cells connected to one of said selected signal lines are read out therefrom, respectively, and stored in each one of prescribed storage means, respectively, by selecting a separate signal line of said selected group of signal lines, separate individual amount of received light information for a plurality of said photoelectrical conversion element cells connected to said separate signal line of said selected group of signal lines are read out therefrom, respectively, and stored in each one of prescribed storage means, respectively, and further wherein, said individual amount of received light information for said plurality of photoelectrical conversion element cells connected to said one signal line of said selected group of signal lines and said separate individual amount of received light information for said plurality of photoelectrical conversion element cells connected to said separate signal line of said selected group of signal lines being simultaneously and separately output to each of said plurality of output means, respectively.

31. A solid-state image pick-up device according to claim 30, wherein said multiple signal line received light amount value storage means comprises a control means formed by a plurality of input signal switching means.

32. A solid-state image pick-up device according to claim 31, wherein any one of said multiple signal line received light amount value storage means is configured so that, by selection of one of said plurality of input signal switching means, voltage values of each photoelectrical conversion element cell connected to any one of said signal lines in said selected group of signal lines, are stored in one voltage value storage means selected from said plurality of voltage storage means, respectively.

33. A solid-state image pick-up device according to claim 32, wherein, by switching said control means, voltage values of individual photoelectrical conversion element cells connected to separate signal line in said selected group of signal lines, are stored in a separate voltage value storage means within said plurality of voltage value storage means, respectively.

34. A solid-state image pick-up device according to claim 32, wherein voltage values that are stored in each of said plurality of voltage storage means of said multiple signal line received light amount value storage means are selectively and simultaneously output to said output means, via a single switching means.

35. A solid-state image pick-up device according to claim 12 or any one of claim 30 to claim 34, wherein said control means is provided commonly to each of said multiple signal line received light amount value storage means provided on each of the signal lines of said selected group of signal lines.

36. A solid-state image pick-up device according to claim 32, wherein each of said plurality of voltage value storage means is connected via a plurality of input switching means that are provided separately in parallel, to one signal line of said selected group of signal lines, and is also connected to a plurality of impedance conversion means provided separately and in parallel, wherein each of said impedance conversion means is connected, via a plurality of switching means provided separately and in parallel, to each of said output means, and further wherein said switching means operate simultaneously so that, in accordance with a common switch control signal, each of said voltage values stored in a plurality of voltage value storage means, respectively, are output simultaneously.

37. A solid-state image pick-up device according to claim 36, wherein said common switching control signal of said switching means is output from said selection circuits that sequentially drive and selects said signal lines of said another group of signal lines.

38. A solid-state image pick-up device according to claim 12 or any one of claims 30 to 35, wherein said separate signal line of said selected group of signal lines is a signal line that is adjacent to said signal line which is selected from said selected group of signal lines, when the selection of a signal line is performed.

39. A solid-state image pick-up device according to claim 3, wherein in said multiple signal line received light amount value storage means, to any one of signal lines selected from said first group of signal lines and said second group of signal lines, said voltage detection means and the source terminals of at least two input switching transistors are connected, and to each of the drain terminals of said two input switching transistors, individual capacitors being connected, respectively, and also said drain terminal being connected to a source terminal of said input switching transistors, separately provided, respectively, the other terminal of said capacitors being grounded, and each of said drain terminals of said at least two output switching transistors being connected to each other, in common, and connected to a switching means via an impedance conversion circuit, one gate terminal of said two input switching transistors having a first input switching signal line connected to it, and the another gate terminal of said input switching transistor having a second input switching signal line connected to it, a gate terminal of the output switching transistor connected to the drain of the input switching transistor to which the first input switching signal line is connected, having a first output switching signal connected to it, and the gate terminal of the output switching transistor connected to the drain of the input switching transistor to which the second input switching signal line is connected, having a second switching signal line connected to it.

40. A solid-state image pick-up device according to claim 3, wherein in said multiple signal line received light amount value storage means, to any one of signal lines selected from said first group of signal lines and second group of signal lines, said voltage detection means and the source terminals of at least two input switching transistors are connected, each of the drain terminals of said two input switching transistors having one capacitor connected to it, respectively, the other end of said capacitor being grounded, each one of said drain terminals thereof having at least two impedance conversion circuits connected to them, separately, outputs of said impedance conversion circuits being separately connected to a plurality of output means, respectively, and a common switching control signal causing voltage values stored in said plurality of voltage value storage means to be simultaneously input to the input section of said switching means which each outputs to said separate output means.

41. A method of driving a solid state image pick-up device having a first group of signal lines, a second group of signal lines, each of which intersecting those of said first group of signal lines in a matrix arrangement, a first selection circuit that sequentially selects and drives said first group of signal lines, a second selection circuit that sequentially selects and drives said second group of signal lines, a plurality of photoelectrical conversion element cells that are provided in the vicinity of each one of a region of intersection points formed between each one of lines of said first group of signal lines and each one of lines of said second group of signal lines, and that are connected thereto, and at least an output means for separately outputting individual amounts of received light information of said photoelectrical conversion element cells, and further said device being configured so that, by selecting a part of either said first group of signal lines and said second group of signal lines, individual amount of received light information for a plurality of photoelectrical conversion element cells connected to one of said selected signal lines of said selected group of signal lines are read out and, by sequentially scanning the another group of signal lines, individual amount of received light information read out from said each one of said photoelectrical conversion element cells are sequentially and separately output to said output means, wherein said method is characterized in that a selection being made of one signal line of said selected group of signal lines and, during the period in which individual amount of received light information for a plurality of photoelectrical conversion element cells connected to said selected group of signal lines is output to said output means, a separate signal line of said selected group of signal lines is selected, so that individual amount of received light information for the plurality of photoelectrical conversion element cells connected to said separate signal line of said selected group of signal lines is read out.

* * * * *

UNITED STATES PATENT AND TRADEMARK OFFICE
CERTIFICATE OF CORRECTION

PATENT NO. : 6,697,113 B1
DATED : February 24, 2004
INVENTOR(S) : Tanaka et al.

It is certified that error appears in the above-identified patent and that said Letters Patent is hereby corrected as shown below:

Column 1,
Line 53, delete "j=1, 2,..., n)" and insert -- (j=1, 2,..., n) --

Column 30,
Lines 33-34, delete "any one of claim 1 through claim 6" and insert -- claim 1 --
Lines 39-40, delete "any one of claim 1 to claim 8" and insert -- claim 1--

Column, 30,
Lines 42-43, delete "any one of claim 1 to claim 9" and insert -- claim 1 --
Lines 46-47, delete "any one of claim 1 to claim 10" and insert -- claim 1 --
Lines 49-50, delete "any one of claim 1 to claim 10" and insert -- claim 1 --

Column 31,
Lines 6-7, delete "any one of claim 13 to claim 15" and insert -- claim 13 --
Lines 14-15, delete "any one of claim 13 to claim 16" and insert -- claim 13 –
Lines 20-22, delete "any one of claim 1 to claim 11 or any one of claim 13 to claim 17 " and insert -- claim 1 --
Lines 26-27, delete "any one of claim 1 to claim 11 or any one of claim 13 to claim 18" and insert -- claim 1 --

Column 32,
Line 17, delete "wherein;" and insert -- wherein --
Line 66, delete "or any one of claim 22 to claim 24"

Column 33,
Line 8, delete "25" and insert -- 24 --
Lines 28-29, delete "any one of claim 13 to claim 28" and insert -- claim 13 --

Column 34,
Line 64, delete "or any one of claim 30 to claim 34"

UNITED STATES PATENT AND TRADEMARK OFFICE
CERTIFICATE OF CORRECTION

PATENT NO.    : 6,697,113 B1
DATED         : February 24, 2004
INVENTOR(S)   : Tanaka et al.

It is certified that error appears in the above-identified patent and that said Letters Patent is hereby corrected as shown below:

Column 35,
Line 21, delete "or any one of claims 30 to 35"

Signed and Sealed this

Fourth Day of January, 2005

JON W. DUDAS
*Director of the United States Patent and Trademark Office*